United States Patent [19]

Ogawa et al.

[11] Patent Number: 5,331,614
[45] Date of Patent: Jul. 19, 1994

[54] CONTROLLING PLAYING OPERATIONS OF A PLURALITY OF MAGAZINE TYPE DISC PLAYERS EACH HAVING EXCLUSIVE ACCESS TO DISC LOADED THEREIN

[75] Inventors: Masaya Ogawa; Takao Yamada; Takeshi Kitaki; Haruyasu Sakata; Kazuo Yajika; Yoshikiyo Konno, all of Tokorozawa, Japan

[73] Assignee: Pioneer Electronic Corporation, Tokyo, Japan

[21] Appl. No.: 893,947

[22] Filed: Jun. 4, 1992

Related U.S. Application Data

[63] Continuation of Ser. No. 579,514, Sep. 10, 1990, abandoned.

[30] Foreign Application Priority Data

Sep. 11, 1989 [JP] Japan ................... 1-234947

[51] Int. Cl.⁵ ............................. G11B 17/22
[52] U.S. Cl. ............................. 369/34; 369/36; 369/178
[58] Field of Search ............ 367/33, 34, 36, 38, 367/39, 30, 32; 369/178

[56] References Cited

U.S. PATENT DOCUMENTS

| | | | |
|---|---|---|---|
| 4,527,262 | 7/1985 | Manto | 369/38 |
| 4,647,989 | 3/1987 | Geddes | 369/30 |
| 4,766,581 | 8/1988 | Korn et al. | 369/30 |
| 4,797,865 | 1/1989 | Imai et al. | 369/39 |
| 4,899,326 | 2/1990 | Takeya et al. | 369/36 |
| 5,034,935 | 7/1991 | Ishibashi et al. | 369/36 |

FOREIGN PATENT DOCUMENTS

| | | | |
|---|---|---|---|
| 0388056 | 9/1990 | European Pat. Off. | 369/30 |
| 2625591 | 7/1989 | France . | |
| 63-122055 | 5/1988 | Japan | 369/33 |
| 63-129582 | 6/1988 | Japan | 369/33 |
| 8601326 | 2/1986 | PCT Int'l Appl. . | |
| 2204180 | 4/1988 | United Kingdom . | |

OTHER PUBLICATIONS

Patent Abstracts of Japan, vol. 8, No. 204 (P-301)[1641], Sep. 18, 1984.
Patent Astracts of Japan, vol. 9, No. 232 (P-389)[1955], Sep. 18, 1985.
Patent Abstracts of Japan, vol. 8, No. 202 (P-300)[1639], Sep. 14, 1984.

*Primary Examiner*—Willis: Davis L.
*Assistant Examiner*—Edward Sikorski

[57] ABSTRACT

A disc playing and controlling apparatus which includes a plurality of magazine type disc players. When a first disc player is operating, the apparatus controls the other disk players to find and load a disc holding the next song to be played. Before searching for the next song, the controller determines whether one player is already set in a standby position or whether the next song is located in the player currently being operated. If no player has been set for the next program, the apparatus reads the next selection from a program list and identifies which magazine contains the selected program based on a data map. The map stores each player number and magazine number in an one-to-one relation with the table of contents data for each song.

8 Claims, 25 Drawing Sheets

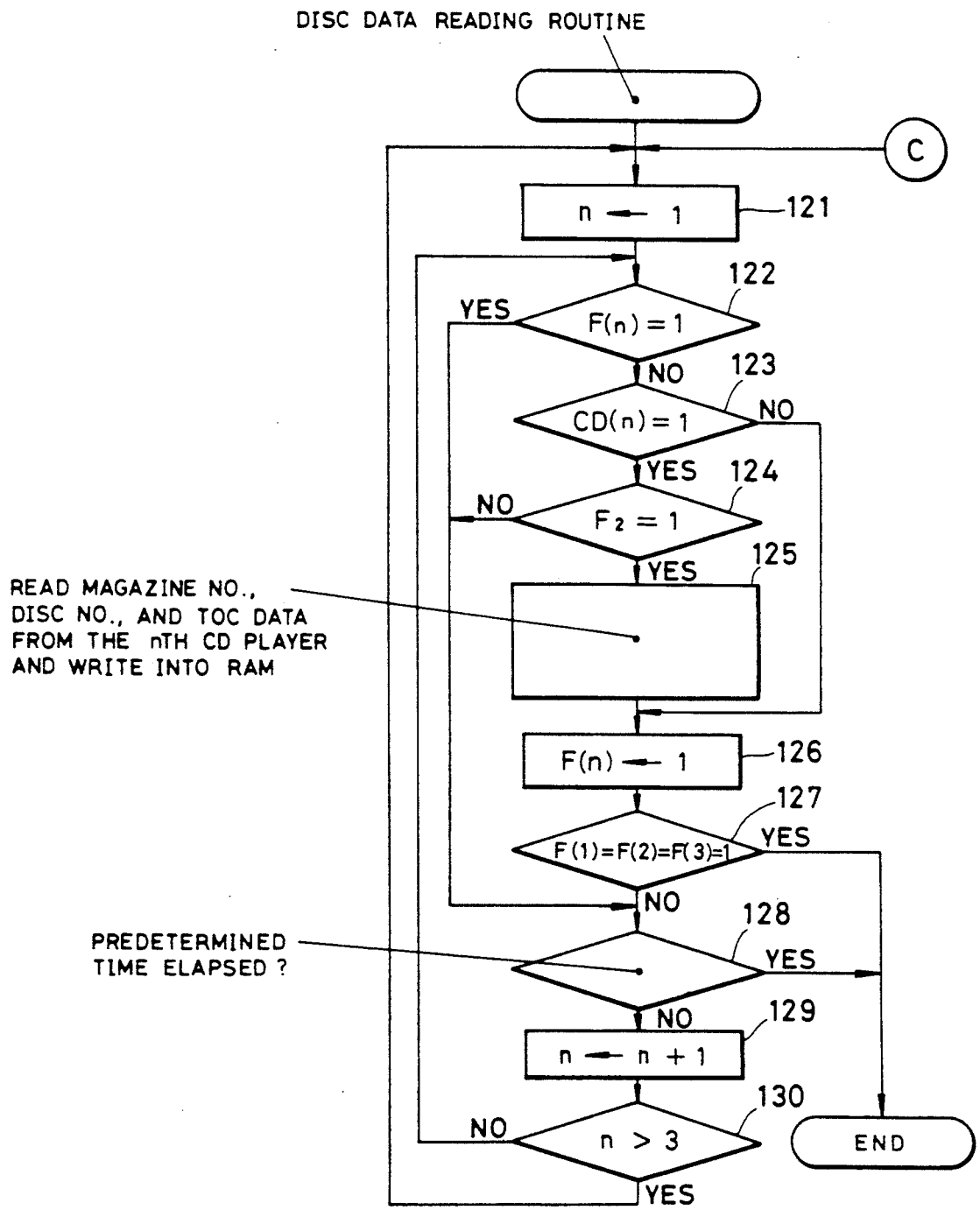

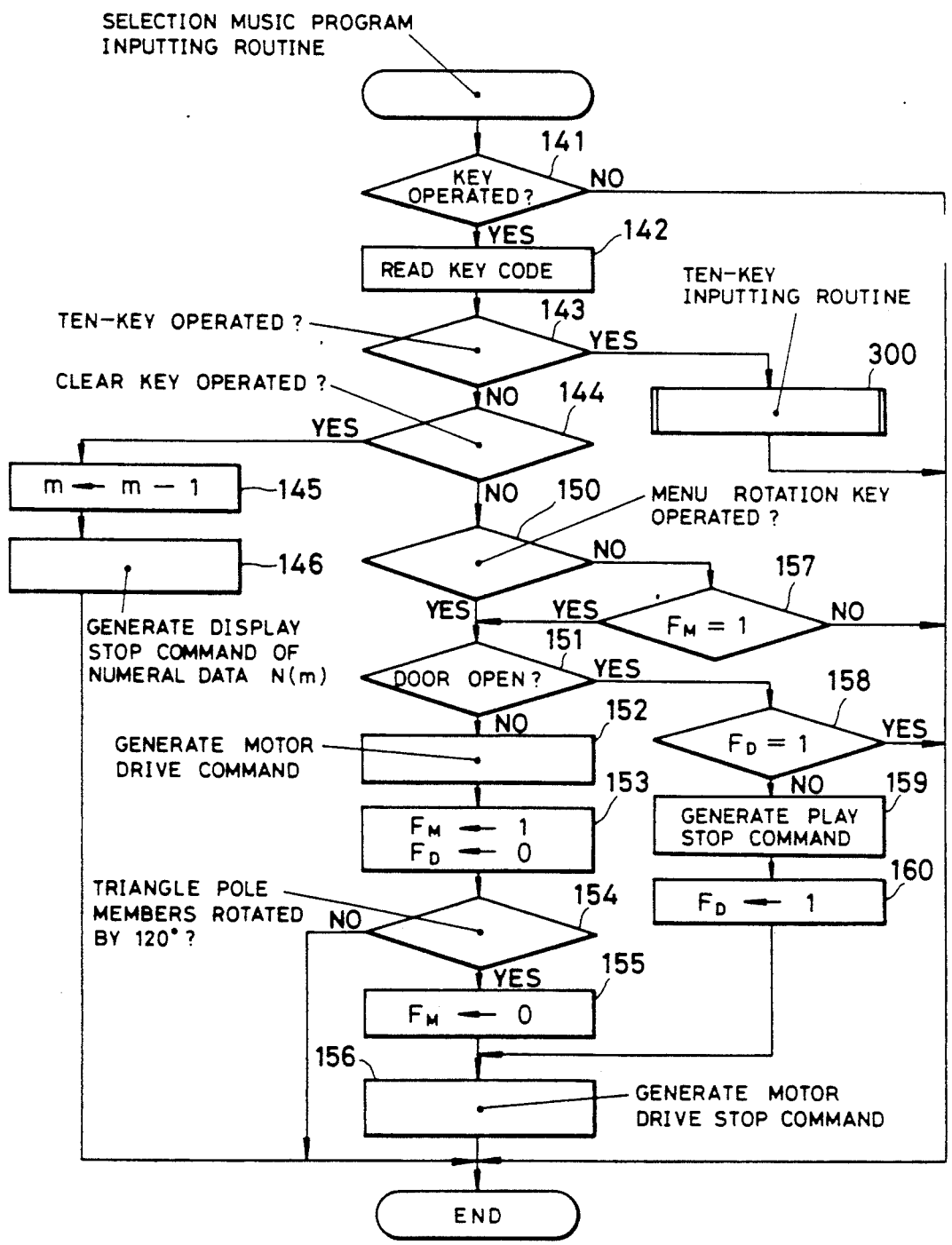

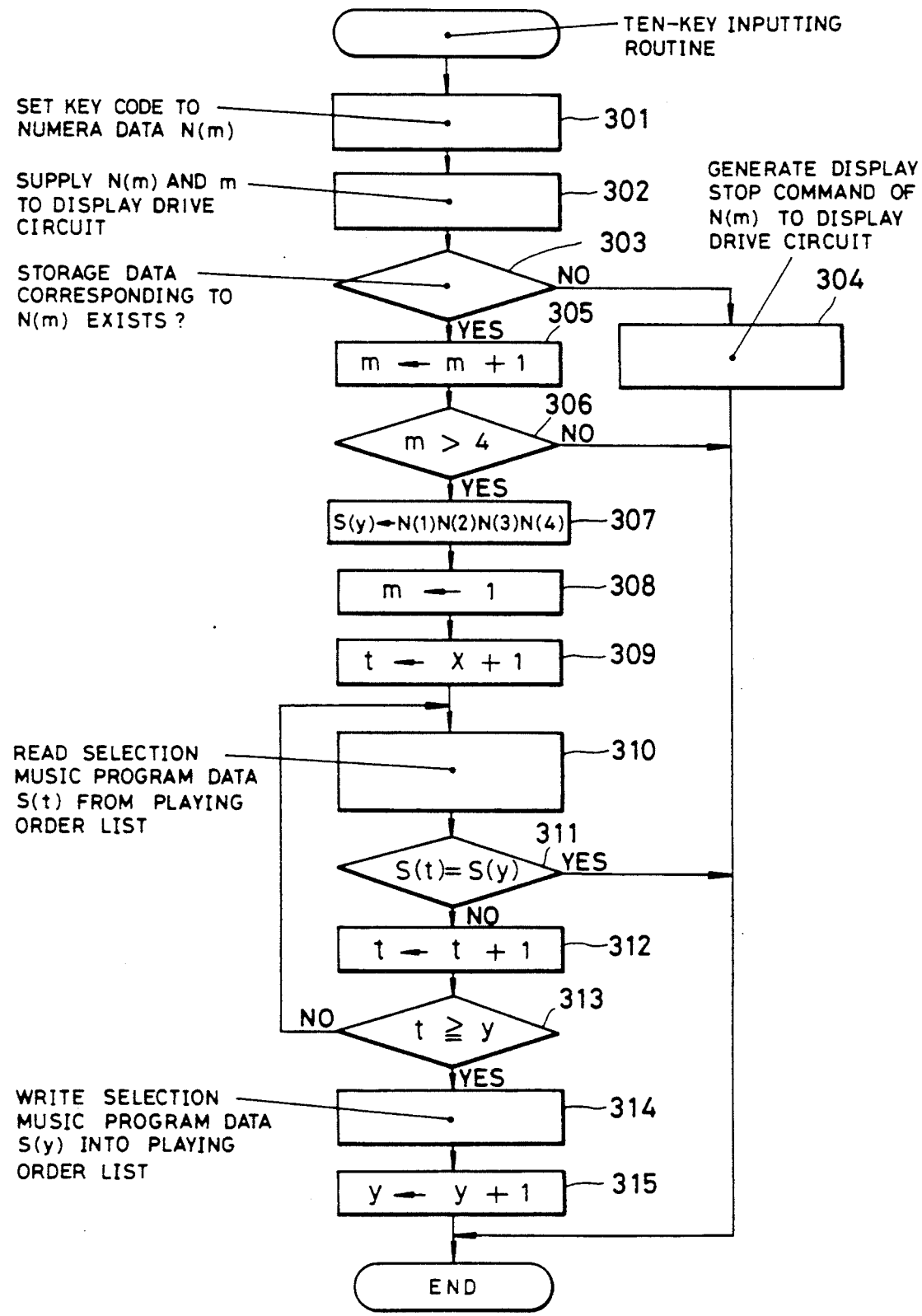

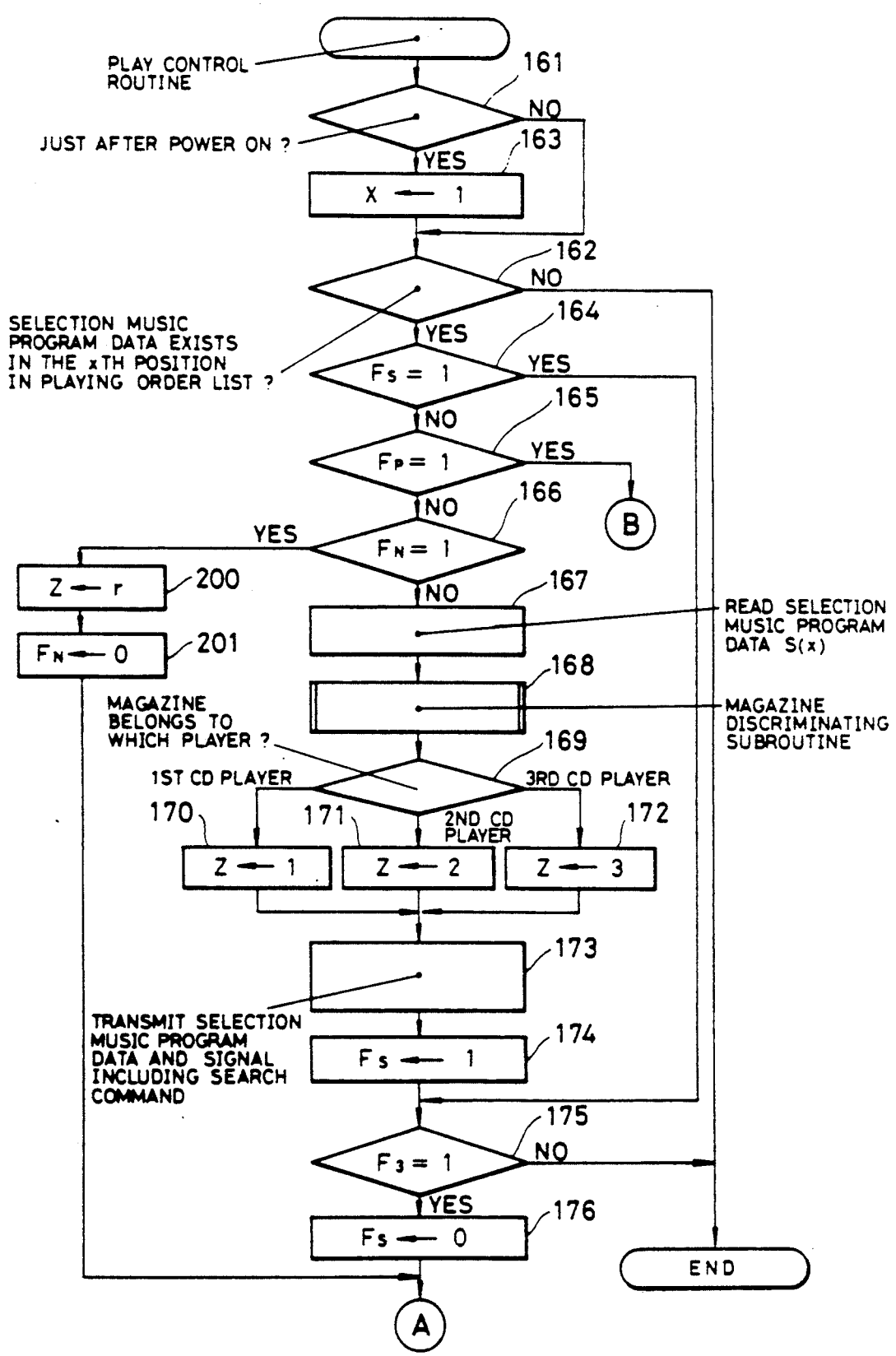

FIG.14

| PLAYER | MAGAZINE | TOC DATA |
|---|---|---|
| 1 | 1 | TOC(1) |
| | | TOC(2) |
| | | TOC(3) |
| | | TOC(4) |
| | | TOC(5) |
| | | TOC(6) |
| | 2 | TOC(1) |
| | | TOC(2) |
| | | TOC(3) |
| | | TOC(4) |
| | | TOC(5) |
| | | TOC(6) |
| | 3 | TOC(1) |
| | | TOC(2) |
| ⋮ | ⋮ | ⋮ |

FIG.15

| ORDER | SELECTION MUSIC PROGRAM DATA |
|---|---|
| 1 | S (1) |
| 2 | S (2) |
| 3 | S (3) |
| 4 | S (4) |
| ⋮ | ⋮ |

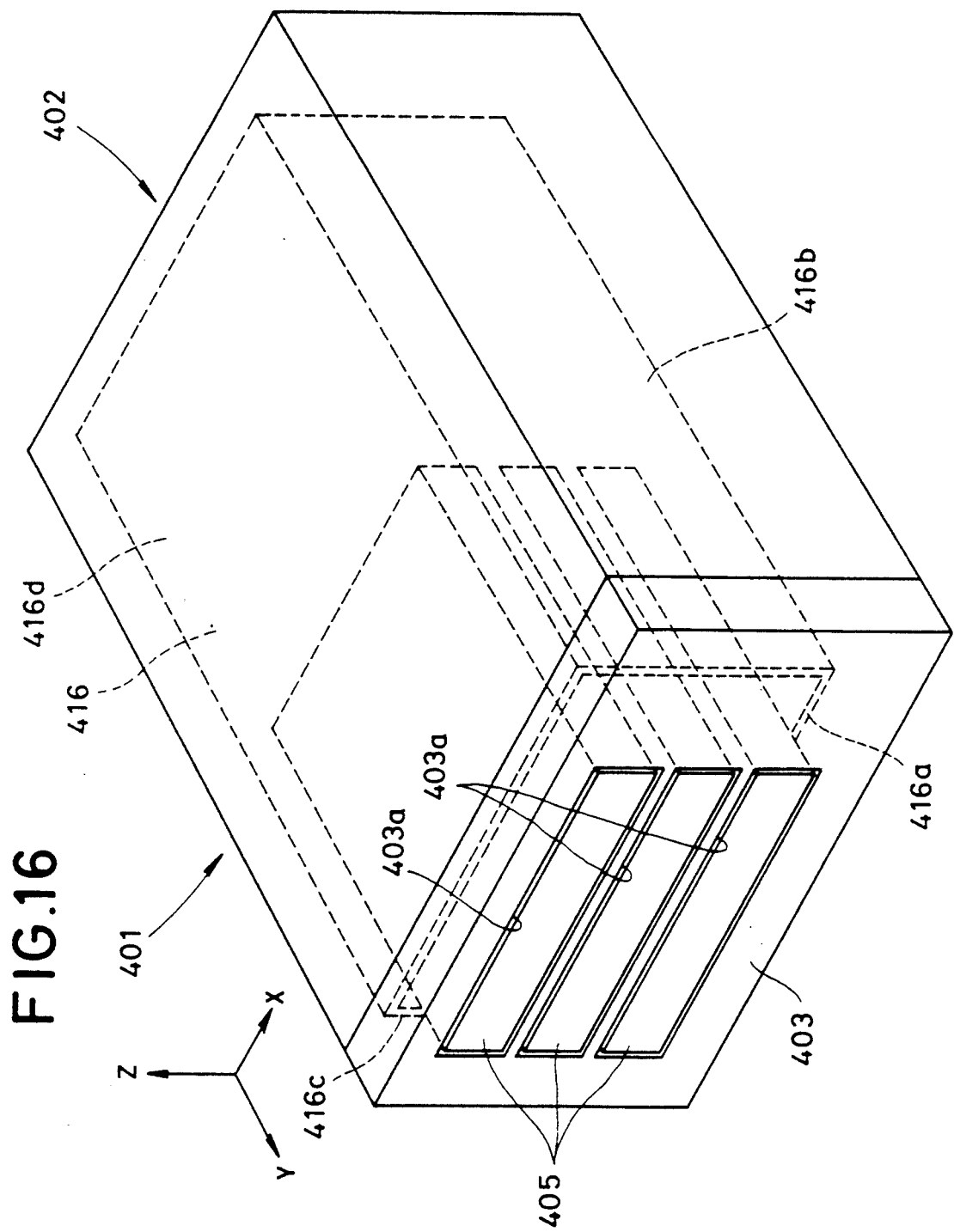

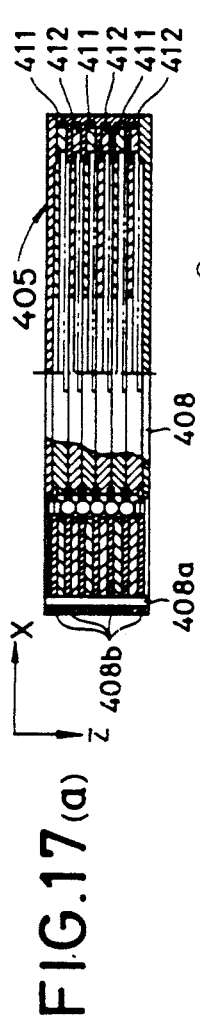
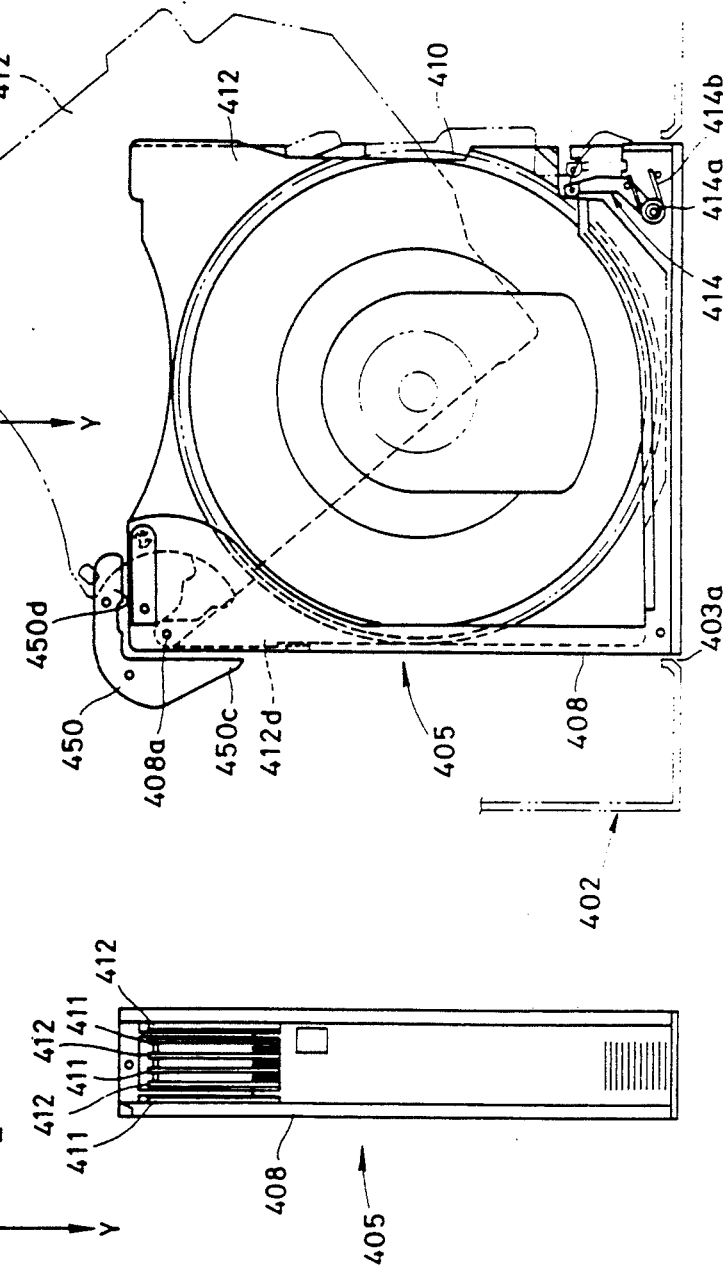
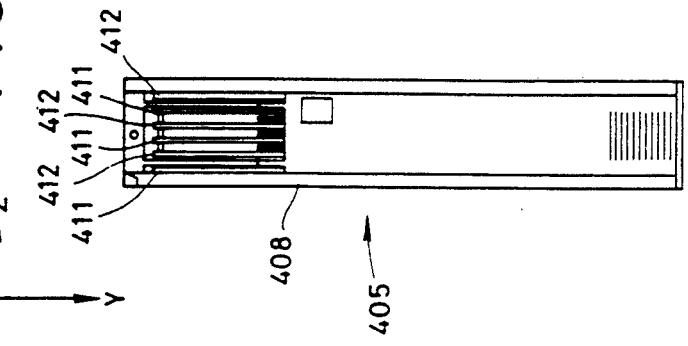
FIG.17(a)
FIG.17(b)
FIG.17(c)

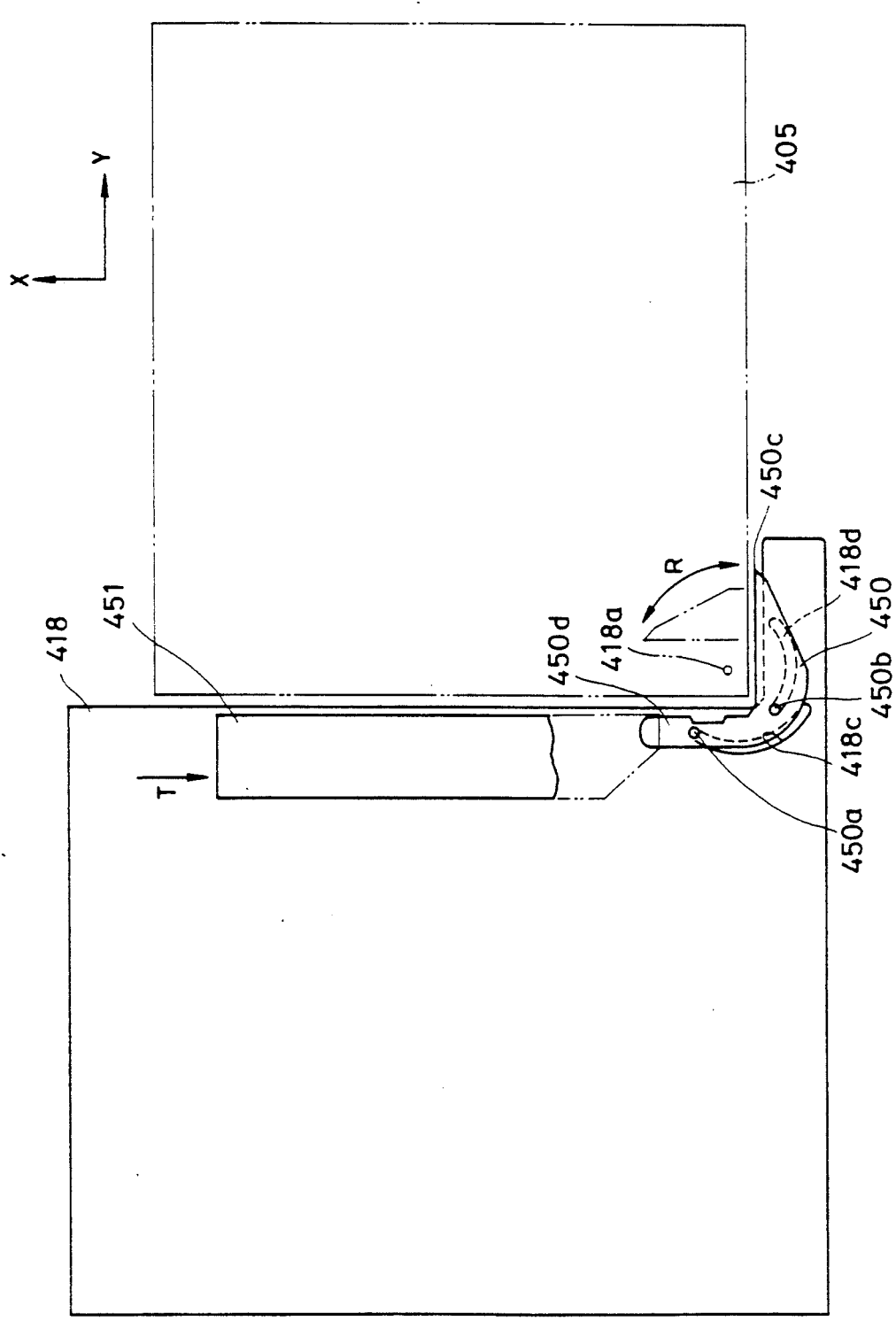

CONTROLLING PLAYING OPERATIONS OF A PLURALITY OF MAGAZINE TYPE DISC PLAYERS EACH HAVING EXCLUSIVE ACCESS TO DISC LOADED THEREIN

This is a continuation of application Ser. No. 07/579,514 filed Sep. 10, 1990 now abandoned.

BACKGROUND OF THE INVENTION

1. Field of the Invention

The present invention relates to an apparatus such as a jukebox or the like for selectively playing a plurality of discs enclosed in the apparatus.

2. Description of the Related Art

For instance, in an apparatus for selectively playing a plurality of discs enclosed therein which has been disclosed in Japanese Patent Application No. 63-180990, designated music programs to be played are consecutively received by the music program selecting operations such as key operations or the like, a disc including the designated music programs is selected from a plurality of discs provided in disc enclosing means and moved onto a turn table, a reading position of the designated music program recorded on the selected disc is searched, and the play of the designated music program is started. However, in the case where upon completion of the play of one designated music program, the disc including the next designated music program differs from the disc which is at present located on the turn table, the disc put on the turn table must be moved into the disc enclosing means and the disc including the next designated music program must be selected and moved onto the turn table. Consequently, there is a problem such that it takes a time until the play of the next designated music program is started after the play of one designated music program was finished.

SUMMARY OF THE INVENTION

It is, therefore, an object of the invention to provide an apparatus for selectively playing a plurality of discs enclosed therein, in which a time which is required after completion of the play of one designated music program until the play of the next designated music program is started can be reduced.

An apparatus for selectively playing a plurality of discs enclosed therein according to the present invention relates to an apparatus which has a plurality of magazine type disc players and in which designated music programs are consecutively received in accordance with the program selecting operations and the magazine type disc players having the discs including the designated music programs consecutively play the designated music programs, wherein the apparatus includes discriminating means for discriminating whether the magazine type disc player having the disc including the next designated music program to be played after completion of the play of the designated music program which is at present being played is different from the magazine type disc player which is now executing the playing operation or not, and if it is determined by the discriminating means that they are different, the magazine type disc player having the disc including the next designated music program to be played is set into a standby mode of the start of the playing operation with respect to the next designated music program to be played and in accordance with the completion of the playing operation of the magazine type disc player which is now executing the playing operation, the playing operation start standby mode is cancelled and the playing operation is started.

BRIEF DESCRIPTION OF THE DRAWINGS

FIGS. 8 to 13 are flowcharts showing the operations of a controller of the apparatus of FIG. 1, respectively;

FIG. 14 is a diagram showing a TOC map;

FIG. 15 is a diagram showing a playing order list;

FIG. 16 is a perspective view of magazine enclosing disc player as an embodiment of the invention;

FIGS. 17(a) to 17(c) are a vertical sectional view, a plan view, and a side elevational view of a magazine which is attached into the magazine enclosing disc player shown in FIG. 16, respectively;

FIG. 24 is a sectional view taken along the line XXIV—XXIV in FIG. 18.

DETAILED DESCRIPTION OF A PREFERRED EMBODIMENT

An embodiment of the present invention will be described in detail hereinbelow with reference to the drawings.

Figure 1:
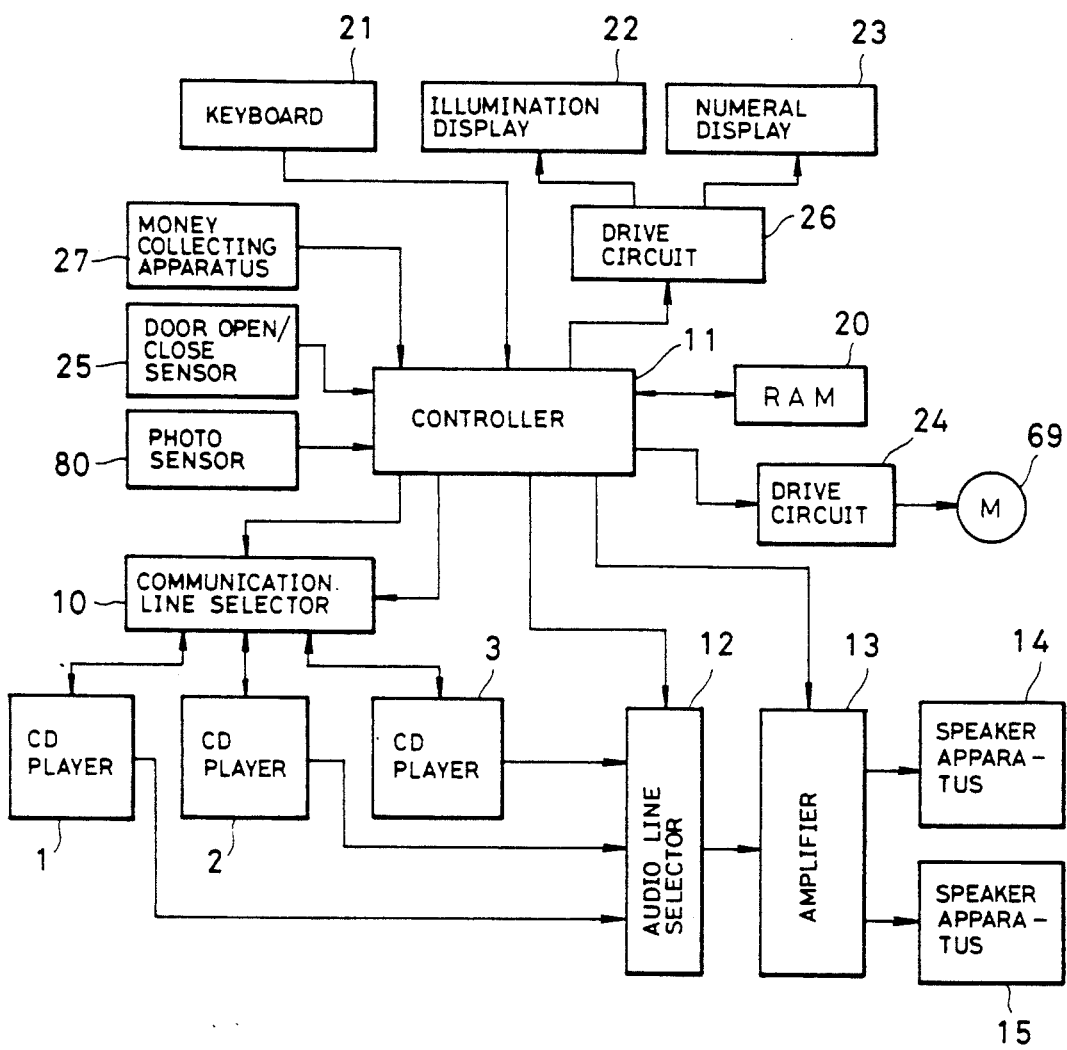
FIG. 1 is a block diagram showing an embodiment of the present invention.

FIG. 1 shows a block diagram of a jukebox as an apparatus for selectively playing a plurality of discs enclosed therein according to the invention. In the jukebox of FIG. 1, three CD (compact disc) players 1 to 3 are provided. The CD players 1 to 3 are what are called magazine type players. Three magazines in each of which six discs can be set can be vertically arranged in the jukebox. The details of the magazine type player have been disclosed in JP-A-61-261853. In the player in which three magazines can be attached, a pickup and a turn table are movable in the vertical direction by a distance corresponding to only three magazines. Although all of the CD players 1 to 3 have been provided in the diagram, only the CD player 2 is previously provided as a standard equipment and the other CD players 1 and 3 are provided as options.

The CD players 1 to 3 have control terminals and audio output terminals. Each of the control terminals is connected to a controller 11 through a communication line selector 10. The CD players 1 to 3 can be individually controlled by the controller 11. An amplifier 13 is connected to each of the audio output terminals through an audio line selector 12. The amplifier 13 amplifies audio signals of the left and right channels which are relayed and supplied from the audio line selector 12, thereby driving left and right speaker apparatuses 14 and 15, respectively. Selecting states of the communication line selector 10 and audio line selector 12 are controlled by the controller 11.

The controller 11 comprises a micro computer and operates in accordance with programs stored in a ROM (not shown) provided therein. A RAM 20 is connected to the controller 11. The RAM 20 is backed up even when a power source is turned off, so that the memory content is not erased. Information regarding discs which were set into each of the CD players 1 to 3 is written into the RAM 20. On the other hand, a keyboard 21, a drive circuit 26 to drive an illumination display 22 and a numeral display 23, a drive circuit 24 of a motor 69, which will be explained hereinlater, and a door open/close state sensor 25 are connected to the controller 11.

The controller 11 and the CD players 1 to 3 are connected by four communication lines via the communication line selector 10. The four communication lines comprise: a ground (earth) line; a signal line from the controller 11 to each of the CD players 1 to 3; a signal line from each of the CD players 1 to 3 to the controller 11; and a confirmation line to confirm that each of the CD players 1 to 3 has been set into the apparatus or not. When the power source is turned on, each of the CD players 1 to 3 outputs a predetermined confirmation voltage (for example, 5 V) to the-control terminal which arrives at the confirmation line. Therefore, on the side of the controller 11, if the predetermined confirmation voltage is not detected through the confirmation line selected by the communication line selector 10, it is possible to determine that the corresponding CD player is not set.

Figure 2:
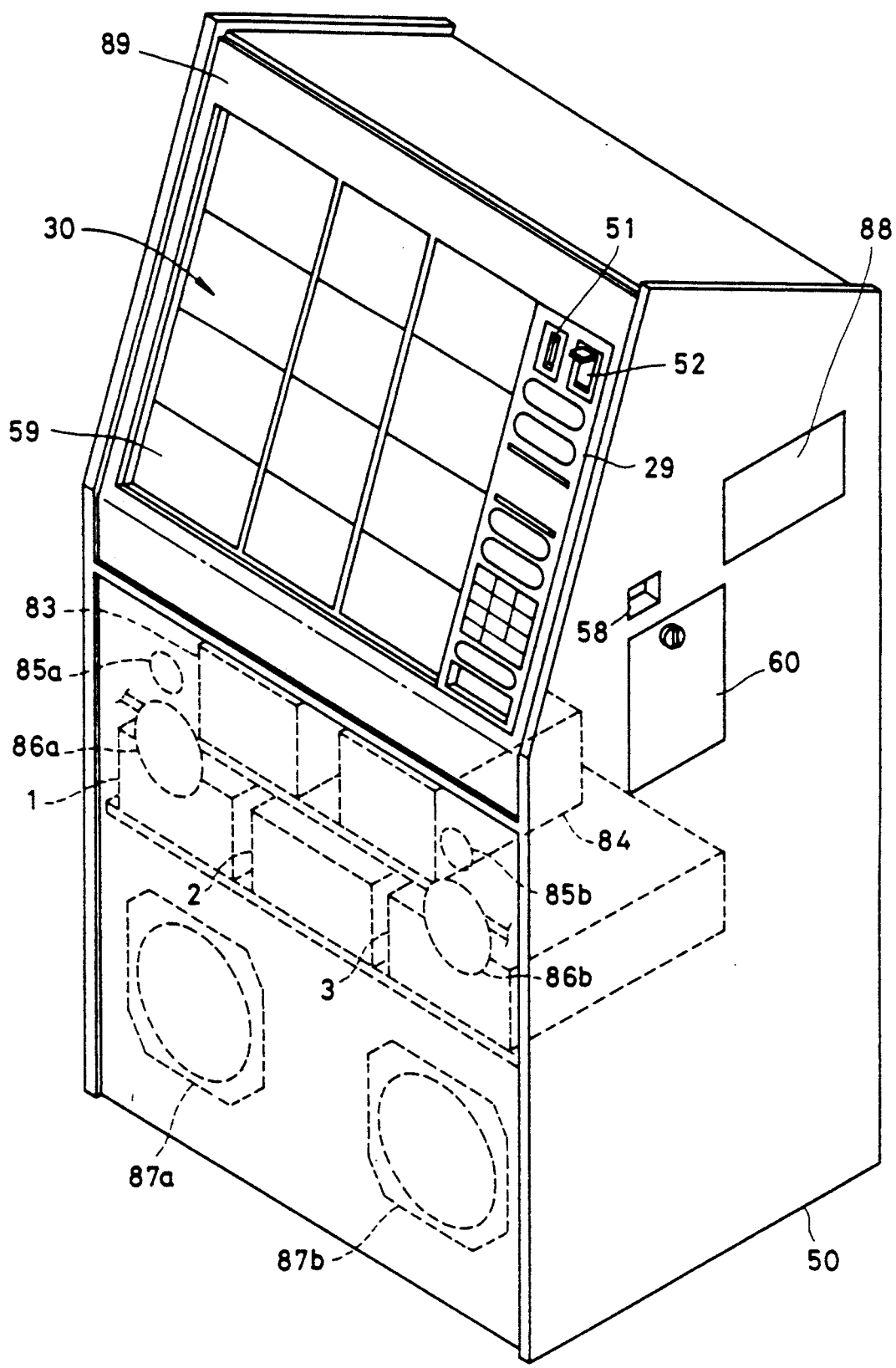
FIG. 2 is an external perspective view of an apparatus of FIG. 1.

As shown in FIGS. 2, 3(a), and 3(b), the jukebox according to the invention is formed in an almost rectangular parallelepiped main body casing 50 which is vertically elongated and whose upper portion of the front surface is inclined. The inside of the main body casing 50 is divided into three regions by partition plates 41 and 42. An operating section 29 and a display section 30 are provided in the inclined portion above the partition plate 41. As shown in FIG. 4, a coin inserting port 51 and a return lever 52 are provided in the top portion of the operating section 29. Therefore, a displaying portion of the illumination display 22 is located under the operating section 29. A selection music program remaining amount counter display 23a and a playing music program counter display 23b are provided as a numeral display 23. A ten-key 54 including a clear key and a menu rotation key 55 are provided below the numeral display 23. The ten-key 54 and menu rotation key 55 form a part of the keyboard 21. A bill inserting port 56 is provided in the lowest portion of the operating section 29. The coin inserting port 51, return lever 52, and bill inserting port 56 construct a part of a money collecting apparatus 27. The money collecting apparatus 27 discriminates the denomination of the coins or bills which were inserted through the coin inserting port 51 or bill inserting port 56 and outputs a signal indicative of the result of the discrimination to the controller 11.

If the return lever 52 was operated before one music program is selected, the inserted coins are returned to a return port 58 formed on the right side surface and the inserted bills are delivered from the bill inserting port 56. After the music program was selected, the inserted coins and bills are collected into a coin box (not shown). The coin box can be taken out by opening a door 60 with a key attached on the right side surface.

Figure 5:
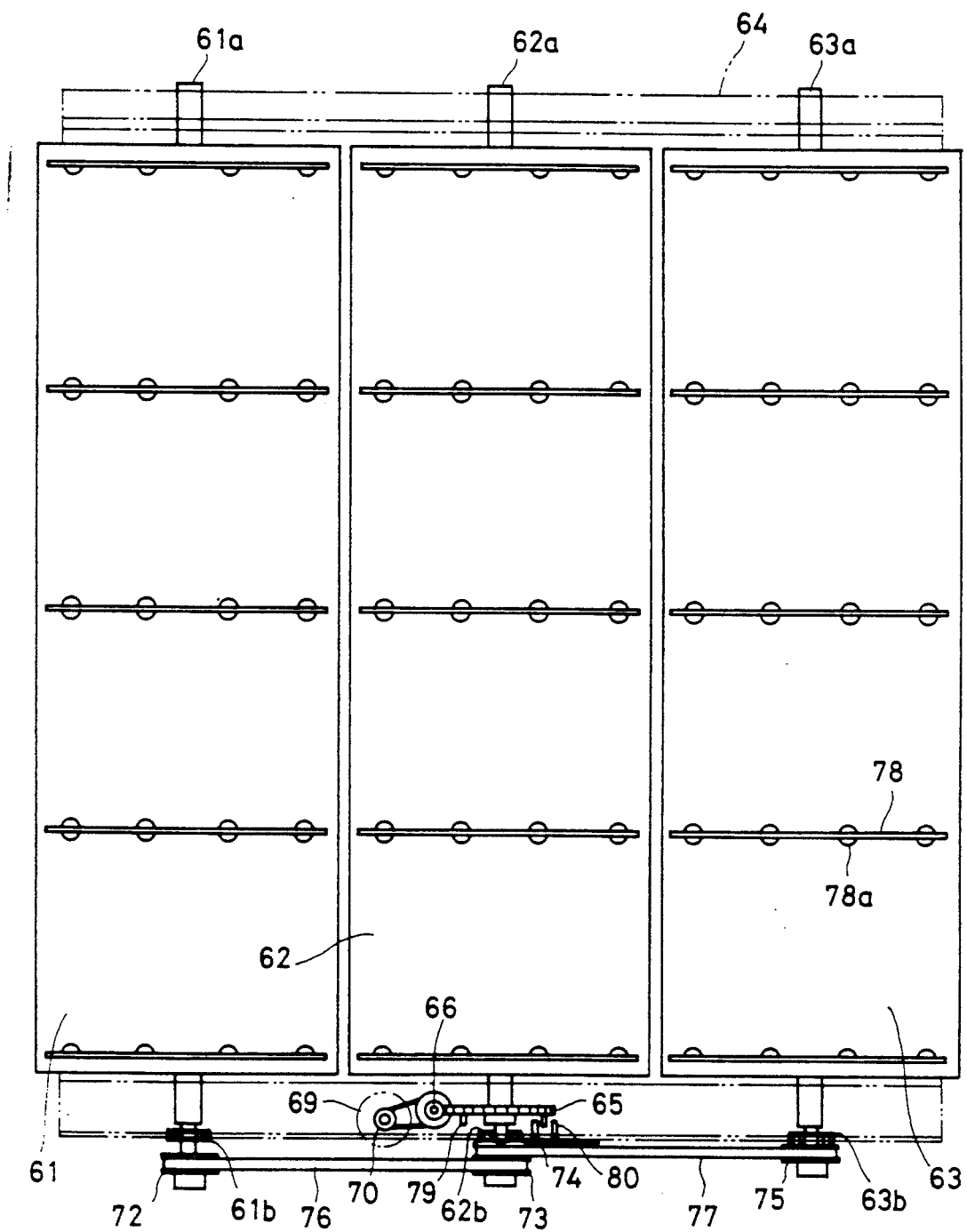
FIG. 5 is a plan view showing a structure of a menu display section.

The display section 30 comprises a transparent plate member 59 made of glass or the like. Three menu displaying triangle pole members 61 to 63 are arranged in parallel in a U-shaped supporting member 64 in the transparent plate member 59. The triangle pole members 61 to 63 are provided as prism menu boards and have rotary shafts 61a to 63a in each of which the center of the triangle is extended in the longitudinal direction and is projected at both ends as shown in FIG. 5. One end of each of the rotary shafts 61a to 63a is set to a slightly smaller diameter. The supporting member 64 is fixed to the main body casing 50. Three shaft inserting holes into which the other ends of the rotary shafts 61a to 63a are inserted are formed in the upper portion of the supporting member 64. Bearings 61b to 63b into which one end of each of the rotary shafts 61a to 63a, that is, small diameter portions of the rotary shafts 61a to 63a are inserted are arranged in the lower portions of the supporting member 64. Thus, the supporting member 64 rotatably supports the rotary shafts 61a to 63a, respectively.

Figure 6:
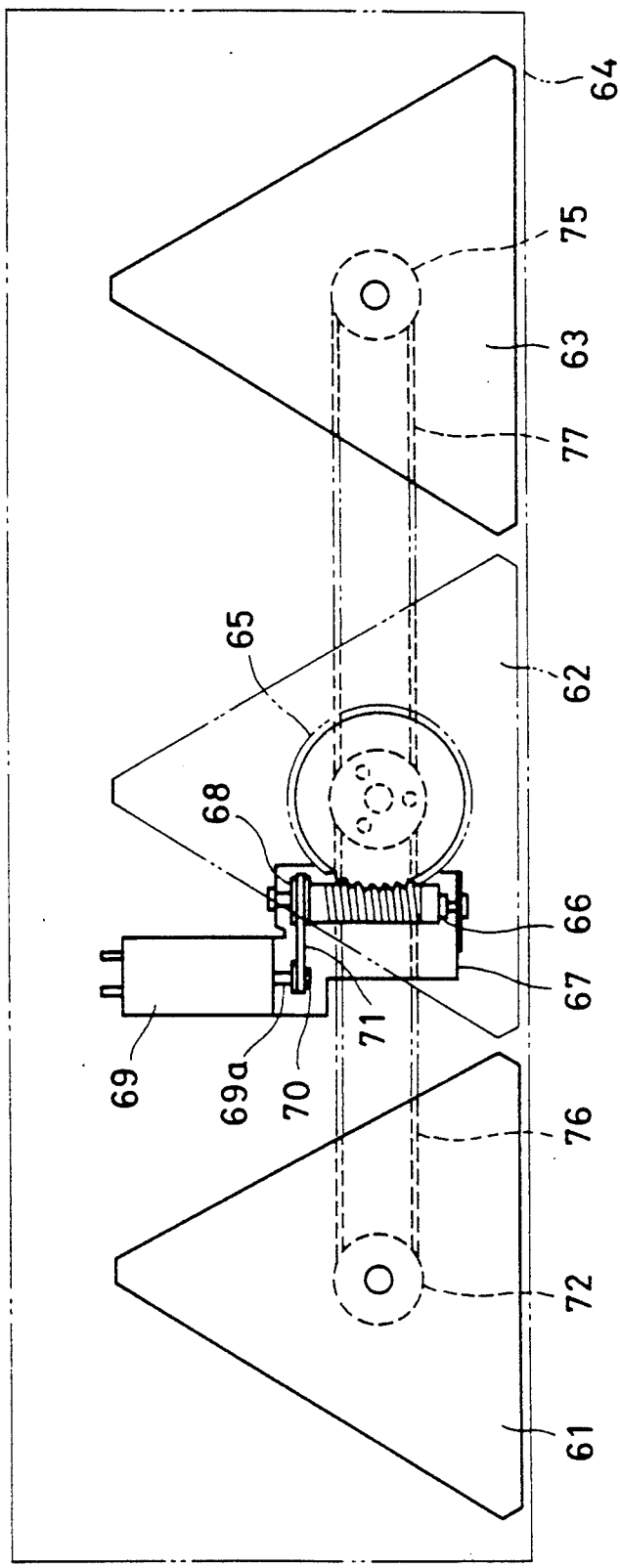
FIG. 6 is a top view showing a structure of the menu display section.

A flat gear 65 is fixed to the inside of the bearing 62b attached at one end of the rotary shaft 62a of the triangle pole member 62 locating at the center. As shown in FIG. 6, the flat gear 65 is in engagement with a worm gear 66. The worm gear 66 is rotatably supported to a supporting member 67. A pulley 68 is provided so as to rotate interlockingly with the worm gear 66. On the other hand, the motor 63 is attached to the supporting member 67. A pulley 70 is fixed to a rotary shaft 69a of the motor 69. A belt 71 is drove between the pulley 68 and the pulley 70. A rotational motion of the motor 69 is transferred to the triangle pole member 62 through the pulley 70, belt 71, pulley 68, worm gear 66, and flat gear 65.

As shown in FIGS. 5 and 6, a pulley 72 is fixed to the small diameter portion of the rotary shaft 61a which projects to the outside of the U-shaped supporting member 64. Similarly, pulleys 73 and 74 are fixed to the small diameter portion of the rotary shaft 62a. A pulley 75 is fixed to the small diameter portion of the rotary shaft 63a. A belt 76 is drove between the pulleys 72 and 73. A belt 77 is drove between the pulleys 74 and 75. The pulleys 72, 73, 74, and 75 have the same diameter, so that the triangle pole members 61 and 63 rotate at the same speed interlockingly with the rotation of the triangle pole member 62. In each of the three surface portions of the triangle pole members 61 to 63, four menu display regions which are segmented by longitudinal guide members 78 are sequentially provided in the longitudinal direction. A plurality of semicircular projecting members 78a are formed on both sides or one side of each guide member 78 at regular intervals. In each of the menu display regions, for example, a jacket sheet of the surface of the casing of each CD is inserted between the guide members 78. A dropout of the CD jacket sheet is prevented by the projecting members 78a.

Figure 7:
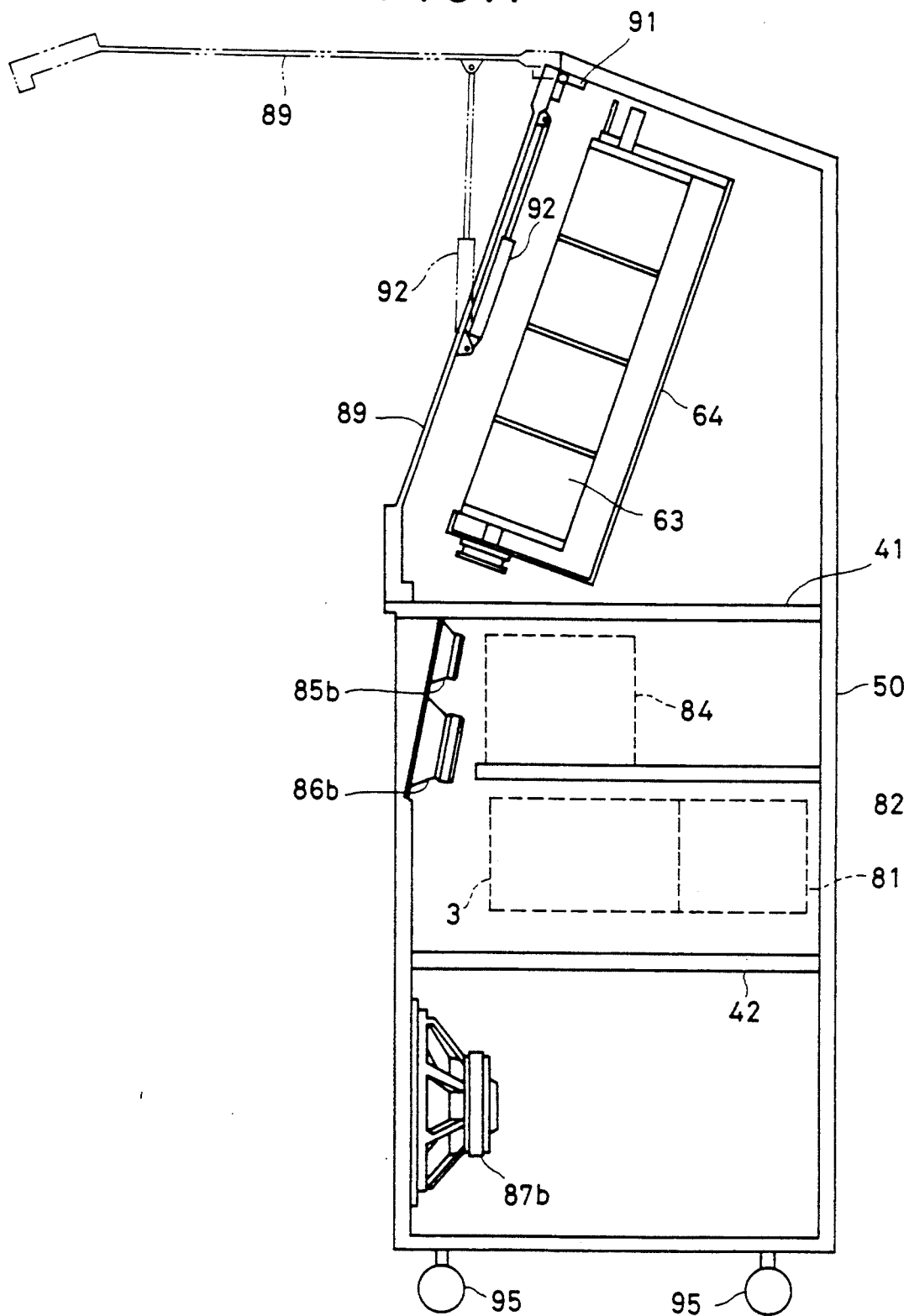
FIG. 7 is a side sectional view showing a state of the apparatus of FIG. 1 in the case where a door is open.

The above inclined portion is formed as a door 89 as shown by an alternate long and two short dashes line in FIG. 7. That is, hinges 90 and 91 (90 is not shown) are provided on the left and right sides in the upper corner portion in the front portion of the main body casing 50. The inclined portion can be opened and closed by the hinges 90 and 91. When the inclined portion is open, the opening state is maintained by an arm member 92 having a damper function, thereby enabling the menus to be exchanged. On the other hand, the door open/close state sensor 25 (not shown in FIG. 7) to detect the open/close state of the door 89 is arranged at a proper position inside of the door 89.

As shown in FIG. 5, three rod-like projecting members 79 are fixed on the same circumference on the surface of the flat gear 65 on the side of the bearing 62b at regular intervals of 120°. A photo sensor 80 comprising a photo coupler is provided at the position corresponding to the projecting members 79 of the supporting member 64. When the projecting member 79 reaches the position of the photo sensor 80, a position detection signal is generated from the photo sensor 80 and supplied to the controller 11.

Figure 3:
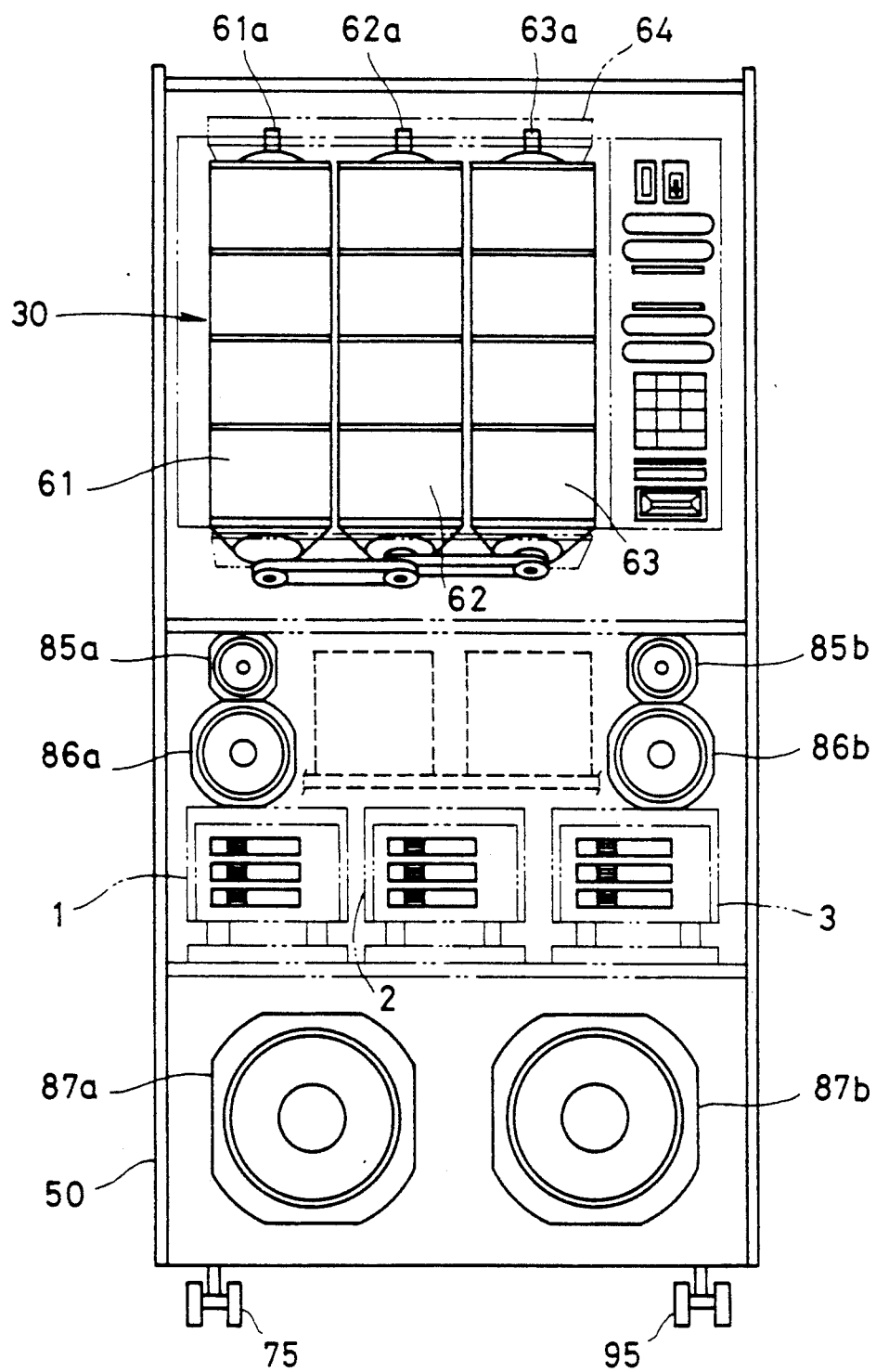
FIG. 3(a) is a front sectional view of the apparatus of FIG. 1.
FIG. 3(b) is a side sectional view of the apparatus of FIG. 1.
Figure 3:
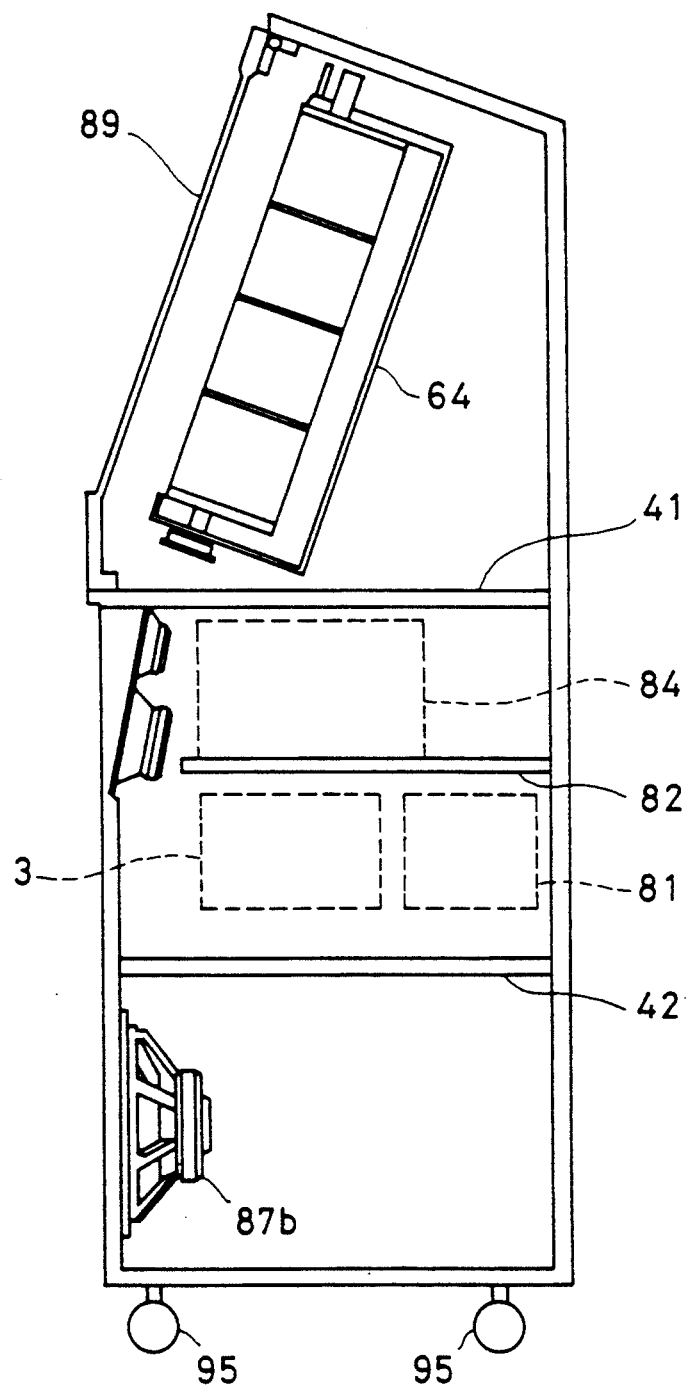
Figure 4:
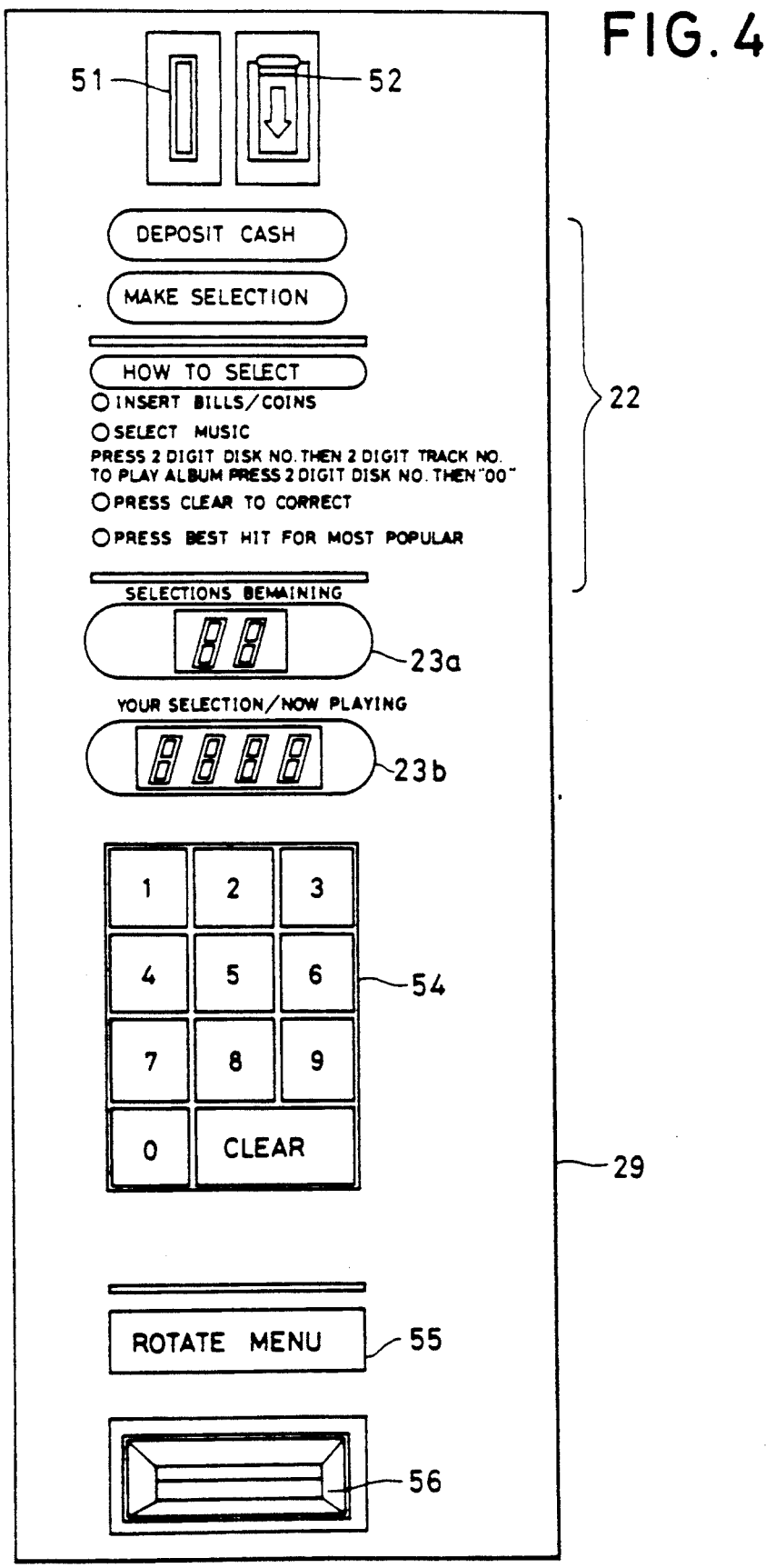
FIG. 4 is a diagram showing an operating section.

As will be also obvious from FIG. 3, a region surrounded by the partition plates 41 and 42 in the main body casing 50 corresponds to an audio apparatus section. The CD players 1 to 3 are enclosed in the audio apparatus section and fixed onto the partition plate 42. Each of the CD players 1 to 3 is fixed to the partition plate 42 in such a direction that the magazines are directed to the front side. This is because the front surface of the main body casing 50 which faces the audio apparatus section is detachably constructed by means (not shown), thereby making it possible to easily exchange or newly set the magazines or discs. A power supply apparatus 81 to supply power sources to the apparatuses such as CD players 1 to 3, controller 11, amplifier 13, etc. is arranged behind the CD player 2. A shelf member 82 is fixed to the main body casing 50 at a position over the CD players 1 to 3 in the audio apparatus section. A control unit 83 and an amplifying apparatus 84 are attached onto the shelf member 82. The control unit 83 includes the communication line selector 10, controller 11, and motor drive circuit 24. The amplifying apparatus 84 includes the audio line selector 12 and amplifier 13. Tweeter speakers 85a and 85b and squawker speakers 86a and 86b are attached to the left and right positions on the front surface of the main body casing 50 which faces the audio apparatus section.

The portion below the partition plate 42 in the main body casing 50 is used as a woofer acoustic section. Woofer speakers 87a and 87b are attached to the front surface of the main body casing 50 corresponding to the woofer acoustic section. The tweeter speaker 85a, squawker speaker 86a, and woofer speaker 87a construct the left speaker apparatus 14. The tweeter speaker 85b, squawker speaker 86b, and woofer speaker 87b construct the right speaker apparatus 15.

Further, speakers 88 for diffusion (the left side speaker is not shown) are attached to the left and right side surfaces in the upper portion of the main body casing 50.

Four wheel members 95 are attached to the bottom surface of the main body casing 50, so that the apparatus is movable.

The operation of the apparatus for selectively playing a plurality of discs enclosed therein according to the invention with the above construction will now be described in accordance with the operation of the controller 11 shown in FIGS. 8 to 13.

When the power source is turned on, the micro processor (not shown) in the controller 11 initializes various flags and counters and, thereafter, first starts the process of a CD player existence discriminating routine. After completion of the above process, the micro processor executes the processes such as disc data reading routine, play control routine, and data exchange control routine in an open door state. The above four processing routines are repeatedly executed. An interrupting process of a selection music program inputting routine is also executed.

Figure 8:
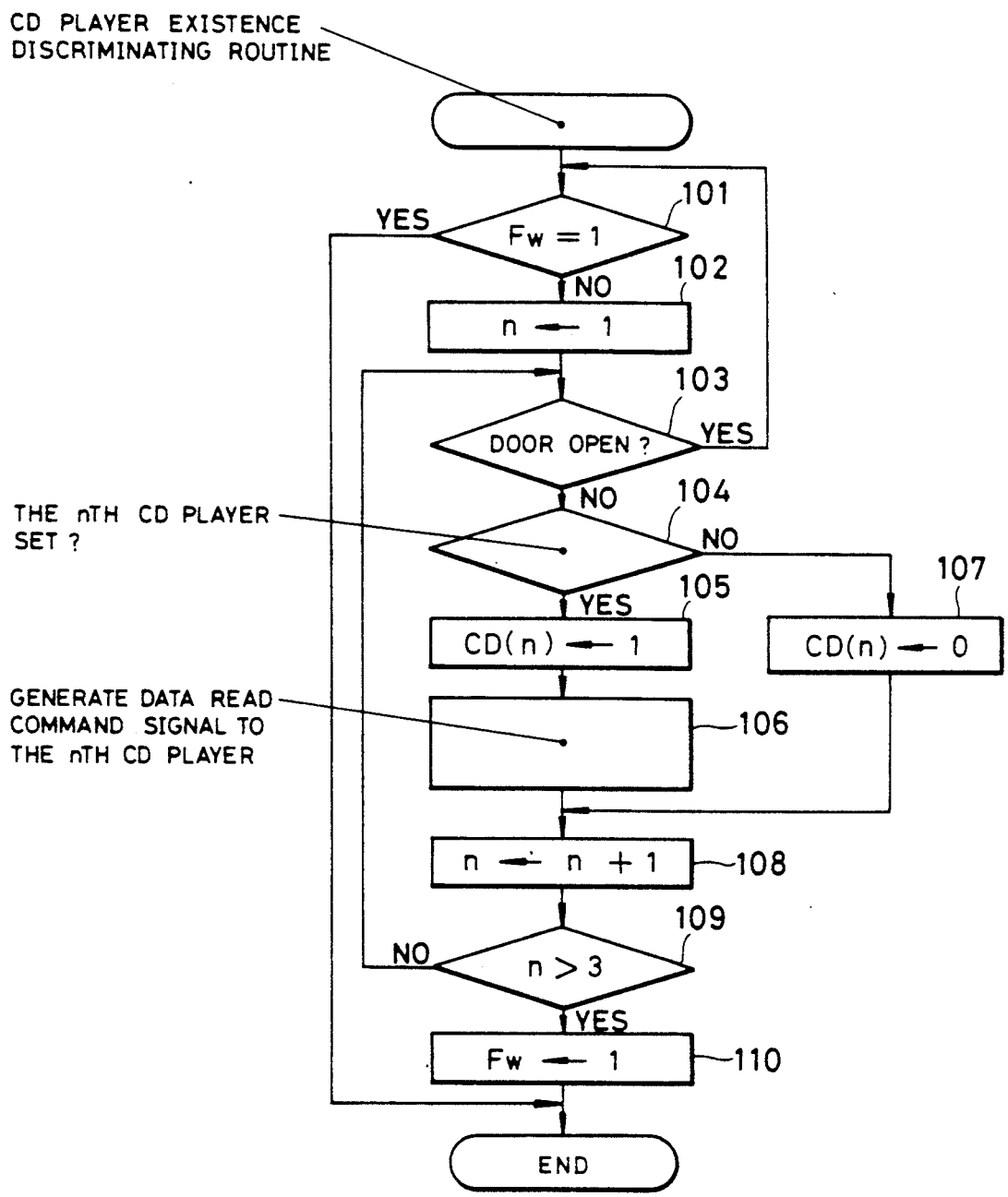

In the CD player existence discriminating routine, the micro processor in the controller 11 first checks to see if an operation flag $F_W$ upon turn-on of the power source has been set to "1" or not (step 101) as shown in FIG. 8. If $F_W = 1$, the process of the CD player existence discriminating routine has already been executed after the turn-on of the power source, so that the process of the above routine is finished. If $F_W = 0$, since the process of the above routine is not yet executed, a variable n is set to "1" (step 102). A check is then made to see if the door 89 is open or not (step 103). If the door 89 is closed, a check is further made to see if the nth CD player has been set or not (step 104). That is, a check is made to see if the nth CD player had been selected by the communication line selector 10 and a predetermined confirmation voltage has been supplied from the confirmation line or not. It is now assumed that the CD player 1 is set to the first CD player, the CD player 2 is set to the second CD player, and the CD player 3 is set to the third CD player. If the predetermined confirmation voltage has been supplied, "1" is set into a flag CD(n) (step 105). A data read command signal is generated to the nth CD player in order to instruct the reading of TOC (Table of Contents) data from each disc set in the magazine (step 106). If the predetermined confirmation voltage is not supplied and the earth potential is obtained, the flag CD(n) is reset to "0" (step 107). After the process in step 106 or 107 was executed, "1" is added to the variable n (step 108). A check is then made to see if the variable n is larger than 3 or not (step 109). If n≦3, step 103 follows. If n>3, "1" is set to the flag $F_W$ (step 110) and the processes of the above routine are finished. By executing the processes of the above routine, the contents of flags CD(1), CD(2), and CD(3), that is, the presence or absence of the CD players 1 to 3 are set.

It is also possible to construct in a manner such that if even one of the magazines is not set in the CD player, the controller 11 ignores such a CD player by stopping the generation of a predetermined confirmation voltage in order to assure the safety.

In the CD players 1 to 3, if a TOC data reading command signal was supplied, the TOC data is read out by the pickup from each of the discs which had been set. The TOC data which was read out every CD players 1 to 3 is written into internal RAMs (not shown) every CD players 1 to 3 together with the magazine numbers and disc numbers. After the CD players 1 to 3 finish the reading and writing operations of the TOC data, a flag $F_2$ indicative of the end of the data reading is set to 1. The flag $F_2$ is formed by an internal controller (not shown) of each of the CD players 1 to 3. The flag $F_2$ is reset to 0 when the power source is turned on or when any one of the magazines is taken out of any CD player. In the CD players 1 to 3, a switch (not shown) to detect the setting of the magazine is provided in every magazine.

After completion of the process of the player existence discriminating routine, the micro processor of the controller 11 executes the disc data reading routine. In the disc data reading routine, as shown in FIG. 9, the variable n is set to 1 (step 121). A check is made to see if the data reading end flag F(n) is equal to 1 or not (step 122). If F(n)=0, a check is made to see if the flag CD(n) is equal to 1 or not (step 123). If CD(n)=0, since the nth CD player is not set, the processing routine soon advances to step 126, which will be explained hereinlater. When CD(n)=1, the flag $F_2$ is read out of the nth CD player and a check is made to see if the read flag $F_2$ is equal to 1 or not (step 124). For instance, when n=1, the flag $F_2$ is read out from the CD player 1 and a check is made to see if the flag $F_2$ is equal to 1 or not. If $F_2$=1, the magazine number, disc number, and TOC data are read out of the internal RAM of the nth CD player and written into a TOC data map in the RAM 20 (step 125). The data reading end flag F(n) is set to 1 (step 126). A check is made to see if all of the data reading end flags F(1), F(2), and F(3) are equal to 1 or not (step 127). If F(1)=F(2)=F(3)=1, this means that the TOC data has already been read out from the CD players existing in the apparatus. Therefore; the above routine is finished. If all of the flags F(1), F(2), and F(3) are not 1, a check is made to see if a predetermined time has elapsed from the start of the processes of the above routine or not (step 128). If only the predetermined time has elapsed, it is regarded that the TOC data cannot be read, so that the above routine is finished. If the predetermined time does not elapse, "1" is added to the variable n (step 129). A check is then made to see if the variable n is larger than 3 or not (step 130). If n≦3, step 122 follows. If n>3, step 121 follows. In step 122, if F(n)=1, this means that the TOC data has already been read from the nth CD player, so that step 128 follows. If $F_2$=0 in step 124, this means that the TOC data is not yet read out of the nth CD player, so that step 128 follows.

As shown in FIG. 14, the TOC data map is formed in the RAM 20. By executing the disc data reading routine mentioned above, the TOC data TOC(1) to TOC(6) are written into the TOC data maps for every magazine. However, if no disc exists, the preceding data at the storage position is erased.

The selection music program inputting routine which is executed by an interrupting process will now be described. In this routine, for instance, as shown in FIG. 10, a check is made to see if key operations have been performed or not by an interruption every constant time period (step 141). If YES, key codes corresponding to the operated keys from the keyboard 21 are sequentially held into an input buffer in the controller 11. After the micro processor read the key codes, the holding positions of the key codes are shifted, so that the read key codes are not held. If no money is collected, the operation of the ten-key is ignored and no key code is held in the buffer. If the key code has been held in the input buffer, it is read out (step 142). A check is then made to see if the read key code indicates the operation of the ten-key or not (step 143). If the ten-key has been operated, the ten-key inputting routine (step 300) is executed. If no key code is held in the input buffer, the processing routine is returned to other routines.

Figure 15:
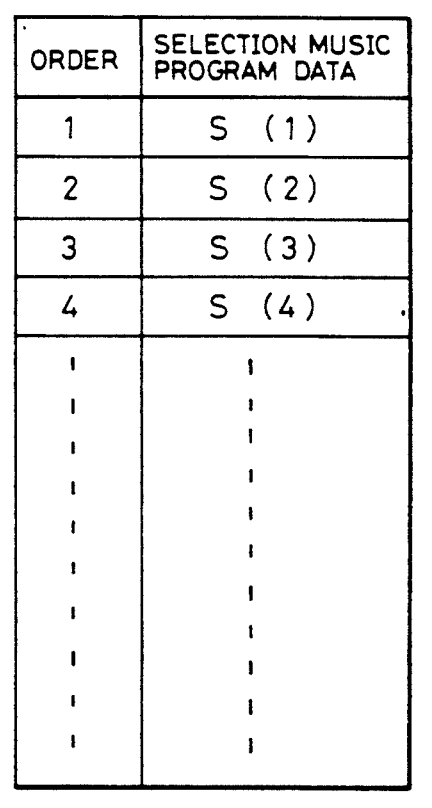

In the ten-key inputting routine, as shown in FIG. 11, the read key code is set to numeral data N(m) (step 301). m denotes a variable and its initial value is equal to 1 as will be explained hereinlater. N(1) indicates a magazine number, N(2) represents a disc number, N(3) a digit of 10 of the track number, and N(4) a digit of 1 of the track number, respectively. The numeral data N(m) and the variable m are supplied to the drive circuit 26 in order to display the value shown by the numeral data N(m) to the playing music program counter display 23b (step 302). Since the value of the variable m indicates the display position from the left edge of the counter display 23b, the drive circuit 24 drives the playing music program counter display 23b so as to display the value indicated by the numeral data N(m) to the position which is designated by the variable m. After the numeral data N(m) and variable m were supplied, a check is made to see if data exists at the storage position in the TOC data map in the RAM 20 which is designated by the numeral data N(m) or not (step 303). That is, if m=1, a check is made to see if data has been written at the storage position corresponding to the magazine number N(m) or not. If m=2, a check is made to see if the disc shown by the disc number N(2) exists in the magazine of the magazine number N(1) or not. If m=3 and 4, a check is made to see if the program of the track number in which the digit of 10 of the track number is equal to N(3) and the digit of 1 is equal to N(4) exists in the disc of the disc number N(2) or not. If no data exists at the storage position in the TOC data map which is designated by the numeral data N(m), a display stop command is generated to the drive circuit 24 in order to stop the display of the numeral data N(m) (step 304) and the above routine is finished. If data exists at the storage position which is designated by the numeral data N(m), "1" is added to the variable m (step 305). A check is then made to see if the variable m is larger than 4 or not (step 306). If m≦4, the routine is finished. If m>4, this means that numerals of four digits which are necessary to select a music program have been input by the operation of the ten-key. Therefore, the numerals of four digits comprising the value N(1) of the digit of 1000, the value N(2) of the digit of 100, the value N(3) of the digit of 10, and the value N(4) of the digit of 1 are set to selection music program data S(y) (step 307). The variable m is set to 1 (step 308). y denotes a variable which is set to the initial value 1 upon turn-on of the power source and indicates the writing order of playing music programs into a playing music program order list formed in the RAM 20. Then, "1" is added to a variable x and a variable t is equalized to the resultant addition value (step 309). A selection music program data S(t) is read out from the position shown by the variable t of the playing music program order list in the RAM 20 (step 310). A check is made to see if the selection music program data S(t) is equal to the selection music program data S(y) or not (step 311). The variable x indicates the present playing music program number in the playing music program order list. If S(t)≠S(y), "1" is added to the variable t (step 312). A check is then made to see if the variable t has reached the variable y or not (step 313). If t<y, step 310 follows. If t≧y, this means that the same selection music program data as the selection music program data S(y) which was input at present is not written in the playing music program order list as a music program to be played since then. Therefore, the selection music program data S(y) is written to the position which is indicated by the variable y in the playing order list (step 314). For instance, assuming that the magazine number N(1) is set to 3, the disc number N(2) is set to 5, the track number N(3), that is, the digit of 10 of the track number is set to 0, and the track number N(4), namely, the digit of 1 of the track number is set to 6, "3506" is written as selection music program data S(y). After the selection music program data S(y) was written, "1" is added to the variable y (step 315) and the routine is finished. If S(t)=S(y), the same selection music program data as the selection music program data S(y) which was input at present has already been written in the playing order list as a previously selected music program yet to be played. Therefore, the selection music program data S(y) is not written and the above routine is finished. As a playing order list, for instance, as shown in FIG. 15, a plurality of selection music program data S(1), S(2), . . . are written into the playing order list. When playing, the selection music program data S(x) of the music program title shown by the variable x is read out and the music program of this title is played as will be explained hereinlater.

If the key code does not indicate the ten-key operation in step 143, a check is made to see if the clear key has been operated or not (step 144). If the clear key has been operated, "1" is subtracted from the variable m (step 145). A display stop command is generated to the drive circuit 24 in order to stop the display of the numeral data N(m) (step 146). Therefore, for instance, if the ten-key indicative of 2 was erroneously operated in place of the correct magazine number 3, by operating the clear key, "2" displayed by the playing music program counter display 23b is extinguished and the apparatus is set into a state in which the magazine number can be again input by the ten-key operation.

If the key code indicates other than the clear key operation, a check is made to see if the menu rotation key 55 has been operated or not (step 150). If the menu rotation key 55 has been operated, a check is made to see if the door 89 is open or not (step 151) on the basis of an output signal of the door open/close state sensor 25.

If the door 89 is closed, a motor drive command is generated to the drive circuit 24 (step 152). A motor drive flag $F_M$ is set to 1 and a door open flag $F_D$ is reset to 0 (step 153). The drive circuit 24 drives the motor 69 in response to the motor drive command. The rotation of the motor 69 is transferred to the triangle pole member 62 through the pulley 70, belt 71, pulley 68, worm gear 66, and flat gear 65. Further, the rotation is transferred to the triangle pole member 61 through the pulley 73, belt 76, and pulley 72 and to the triangle pole member 63 through the pulley 74, belt 77, and pulley 75. Therefore, the triangle pole members 61 to 63 rotate at the same speed in the same direction, for instance, clockwise. When the triangle pole members 61 to 63 rotate at an angle of 120°, the projecting member 79 reaches the position of the photo sensor 80, so that a position detection signal is generated from the photo sensor 80. After the process of step 153 was executed, a check is made to see if the triangle pole members 61 to 63 have rotated by 120° or not (step 154). If the position detection signal was generated from the photo sensor 80, it is regarded that the triangle pole members 61 to 63 had rotated by 120°, so that the motor drive flag $F_M$ is reset to 0 (step 155). a motor drive stop command is generated to the drive circuit 24 (step 156). Since the drive circuit 24 stops the rotation of the motor 69 in response to the motor drive stop command, the triangle pole members 61 to 63 stop at the position where they rotated by 120°. Due to this, new selection music program menus are located and displayed on the front surface. That is, each time the menu rotation key 55 is operated, the triangle pole members 61 to 63 rotate by 120° and the selection music program menus to be displayed are changed. In the case of the embodiment, 36 selection music program menus can be prepared as the number of discs and total 12 menus can be displayed at a time. The drive circuit 24 controls a duty ratio of the motor 69 and gradually changes the duty ratio in accordance with the motor drive stop command, thereby braking and stopping the rotation of the motor 69.

In step 150, if the menu rotation key 55 is not operated, a check is made to see if the flag $F_M$ is equal to 1 or not (step 157). If $F_M=1$, this means that the motor 69 is being driven and the selection music program menus are being changed. Therefore, step 151 follows and a check is made to see if the door 89 is open or not. This step is provided to cope with a case where the door 89 was opened during the change of the selection music program menus. If the door 89 is open, a check is made to see if the flag $F_D$ is equal to 1 or not (step 158). If $F_D=0$, if a music program is being played at present, a play stop command is generated in order to forcedly stop the play of such a music program (step 159). Then, the flag $F_D$ is set to 1 (step 160). The processing routine advances to step 155 and the motor drive stop command is generated to the drive circuit 24 in order to stop the rotations of the triangle pole members 61 to 63. If $F_D=1$, this means that the play has already been stopped and the driving of the motor 69 has also been stopped, so that the above routine is finished. After that, if the door 89 is closed, step 152 follows. Therefore, even if the triangle pole members 61 to 63 do not rotate by 120°, but stopped, they are again rotated and the rotations are stopped in a state in which the selection music program menus are correctly directed to the front surface.

Figure 12B:
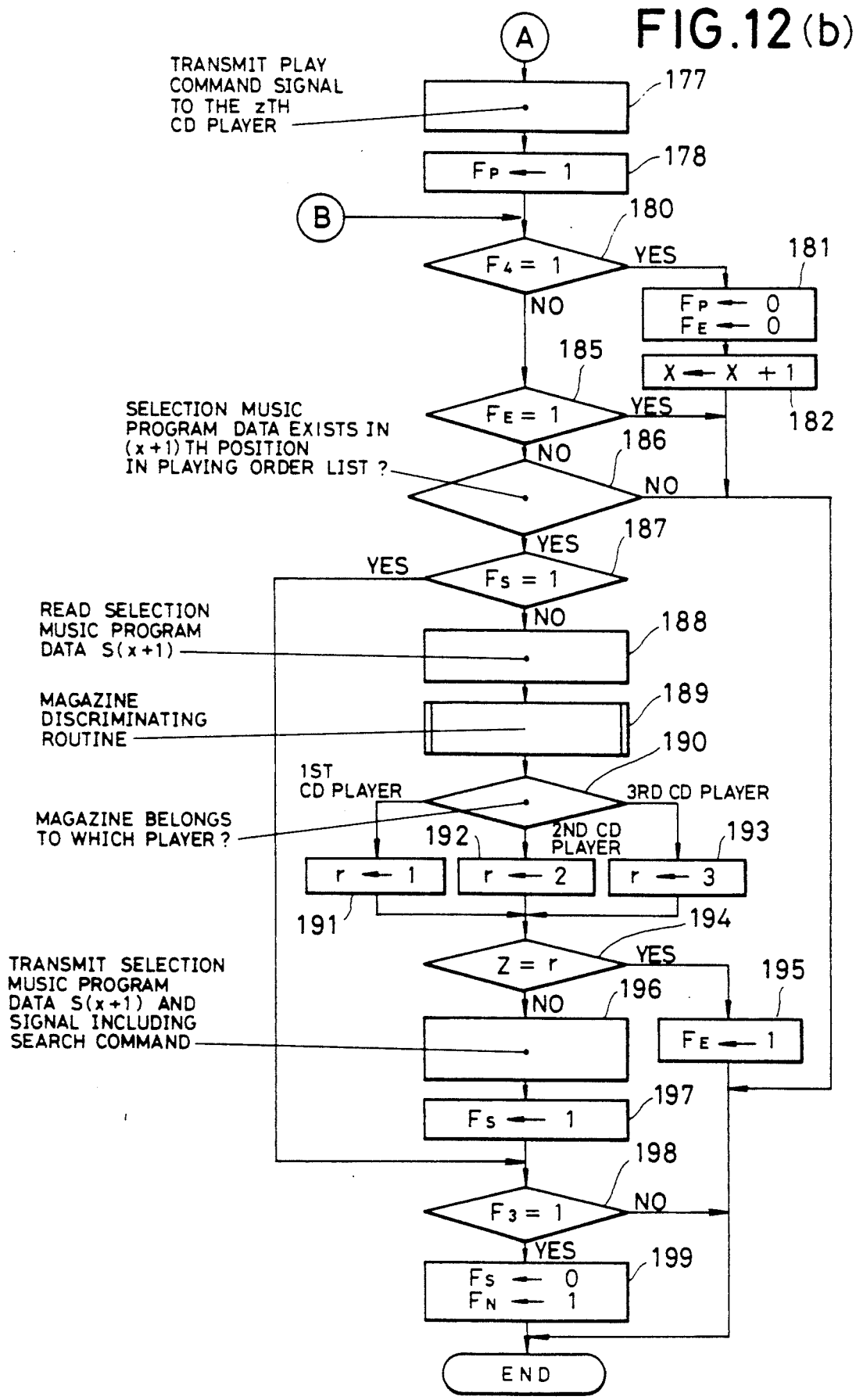

The play control routine will now be described. In the play control routine, as shown in FIGS. 12(a) and 12(b), a check is first made to see if the apparatus is in a state just after the turn-on of the power source or not (step 161). If NO, a check is made to see if the selection music program data has been written in the xth order position in the playing order list or not (step 162). If YES in step 161, the variable x is set to 1 (step 163) and step 162 follows. Discrimination regarding whether the selection music program data has been written to the xth order position in the playing order list or not is performed by detecting whether a writing number y of the selection music program data in step 207 has advanced to xth order or not. If the selection music program data is not written at the xth order position in the playing order list, the processes of this routine are finished. On the contrary, if the selection music program data has been written to the xth order position in the playing order list, a check is made to see if a search flag $F_S$, a play flag $F_P$, and a next music program standby flag $F_N$ are equal to 1 or not (steps 164 to 166). If $F_S=0$, this means that the search operation is not being executed for all of the CD players. If $F_P=0$, this means that none of the CD players are in the playing operation. If $F_N=0$, this means that there is no CD player which is in the standby (playing operation start standby) state with respect to the designated music program to be played next. Therefore, the selection music program data S(x) is read out of the playing order list (step 167). A magazine discriminating subroutine to discriminate the magazine number from the selection music program data S(x) which was read out is executed (step 168). The above subroutine is obtained by setting the value of the digit of 1000 of the selection music program data S(x) to the magazine number M(x). For instance, 0.001 is multiplied to the data S(x). A check is made to see if the resultant magazine number M(x) indicates a magazine which corresponds to one of the CD players (step 169). If the magazine number M(x) is 1 to 3, this means that the magazine belongs to the first CD player 1 and a variable z is equalized to 1 (step 170). If the magazine number M(x) is 4 to 6, the magazine belongs to the second CD player 2 and the variable z is equalized to 2 (step 171). If the magazine number M(x) is 7 to 9, the magazine belongs to the third CD player 3 and the variable z is equalized to 3 (step 172). A signal including a search command is transmitted to the zth CD player together with the selection music program data S(x) in a predetermined format (step 173). The search flag $F_S$ is set to 1 in order to indicate that the search operation is being executed (step 174).

In the zth CD player, if the search command is received together with the selection music program data S(x), the operation according to the magazine number, disc number, and track number shown by the selection music program data S(x) is executed. Now, assuming that the selection music program data S(x) has a value shown by "abcd", the magazine of the magazine number a is selected and the disc of the disc number b is selected from this magazine and is moved onto the turn table. The rotation of the disc is started and the pickup is moved over the track of the track number cd by the search operation. When the pickup is located over the track of the track number cd, the movement of the pickup is stopped. Simultaneously with the end of the search operation, the zth CD player is set into the standby mode. In this case, the standby mode corresponds to either what is called a pause state or a stop state. Since the above operations are well known, their detailed descriptions are omitted here. When the zth CD player is set into the standby mode, a play standby flag $F_3$ is set to 1 and supplied to the controller 11.

Therefore, after the process of step 174 was executed, the controller 11 discriminates to see if the play standby flag $F_3$ of the zth CD player has been set to 1 or not (step 175). If $F_S=1$ in step 164, step 175 soon follows. If $F_3=1$, since this means that the search operation was finished, the search flag $F_S$ is reset to 0 (step 176). A play command signal is sent to the zth CD player (step 177). The play flag $F_P$ is set to 1 to indicate that the music program is being played (step 178). In the zth CD player, after the play standby flag $F_3$ was reset to 0 in accordance with the play command signal, the playing operation of the music program of the track number cd is started. The audio signals of the right and left channels which are output from the zth CD player are supplied to the amplifier 13 through the audio line selector 12, the speaker apparatuses 14 and 15 are driven, and reproduced sounds are output. After the playing operation of the music program of the track number cd was finished, the controller of the zth CD player sets a play end flag $F_4$ to 1. The magazine number, disc number, and track number regarding the music program which is being played are displayed by the playing music program counter display 23b during the play.

After the process of step 178 was executed, the controller 11 discriminates whether the play end flag $F_4$ of the zth CD player has been set to 1 or not (step 180). If $F_P=1$ in step 165, step 180 soon follows. If $F_4=1$, this means that the play of the music program by the selection music program data S(x) was finished, so that the play flag $F_P$ and a standby inhibition flag $F_E$ are reset to 0, respectively (step 181). "1" is added to the variable x (step 182) for the play by the selection music program data of the next order. The processes of the above routine are finished.

If $F_4=0$ in step 180, the zth CD player is playing, so that a check is made to see if the standby inhibition flag $F_E$ is equal to 1 or not (step 185). If $F_E=1$, since it was determined to be $z=r$ in step 194, which will be explained hereinlater, the music program of the selection music program data written at the $(x+1)$th order position in the playing order list is included in the disc which was set to the zth CD player which is playing and the zth CD player cannot be set into the standby mode. Therefore, the processes of the above routine are finished. If $F_E=0$, a check is made to see if the selection music program data has been written in the $(x+1)$th order position in the playing order list or not (step 186). If NO in step 186, the processes of the routine are finished. On the contrary, if the selection music program data has been written in the $(x+1)$th order position in the playing order list, a check is made to see if the search flag $F_S$ is equal to 1 or not (step 187). If $F_S=0$, this means that none of the CD player are performing the search operation, so that selection music program data $S(x+1)$ is read out (step 188). A magazine discriminating subroutine to discriminate the magazine number from the readout selection music program data $S(x+1)$ is executed (step 189). A check is then made to determine which CD player the magazine number $M(x+1)$ corresponds to (step 190). The operations in steps 188, 189, and 190 are similar to those in steps 167, 168, and 169 mentioned above. If the magazine number $M(x+1)$ is 1 to 3, the magazine relates to the first CD player 1 and a variable r is equalized to 1 (step 191). If the magazine number $M(x+1)$ is 4 to 6, the magazine belongs to the second CD player 2 and the variable r is equalized to 2 (step 192). If the magazine number $M(x+1)$ is 7 to 9, the magazine belongs to the third CD player 3 and the variable r is equalized to 3 (step 193).

After the execution of step 191, 192, or 193, a check is made to see if the variables z and r are equal or not (step 194). If $z=r$, the music program of the selection music program data written in the $(x+1)$th order position in the playing order list is included in the disc set in the zth CD player which is playing, so that the standby inhibition flag $F_E$ is set to 1 (step 195). The processes of the above routine are finished. If $z \neq r$, the music program of the selection music program data written in the $(x+1)$th order position in the playing order list is not included in the disc which was set into the zth CD player which is playing. Therefore, a signal including the search command is transmitted to the rth CD player together with the selection music program data $S(x+1)$ in a predetermined format (step 196). The search flag $F_S$ is set to 1 to indicate that the search operation is being executed (step 197). After that, the controller 11 checks to see if the play standby flag $F_3$ of the rth CD player has been set to 1 or not (step 198). If $F_S=1$ in step 187, step 198 soon follows. If $F_3=1$, this means that the search operation was finished. Therefore, the search flag $F_S$ is reset to 0 and a next music program standby flag $F_N$ is set to 1 to indicate that the apparatus has been set into the standby mode with respect to the selection music program data written in the $(x+1)$th order position in the playing order list (step 199). The processes of this routine are finished. If $F_3=0$, this means that the search operation is being executed, so that the processes of the routine are immediately finished.

If $F_N=1$ in step 166, since the CD player which is in the standby mode with respect to the designated music program to be played next exists, the variable z is equalized to the variable r (step 200). The next music program standby flag $F_N$ is reset to 0 (step 201). The processing routine advances to step 177 and the play command signal is sent to the rth CD player.

For instant, assume that the designated music program indicated by the selection music program data written in the xth order position in the playing order list is set to A and the designated music program shown by the selection music program data written in the (x+1)th order position in the playing order list is set to B. If the designated music programs A and B are included on discs which are included in different CD players, the CD player including the designated music program B is selected and the track of the designated music program B is searched and set into the standby mode during the play of the designated music program A. After the play of the designated music program A was finished, the standby mode is soon released and the play of the designated music program B is started.

On the other hand, there is a possibility such that when the designated selection music program data is written into the playing order list, if a memory capacity is small, a data amount exceeds the memory capacity and overflows. However, for instance, it is also possible to erase all of the selection music program data in the playing order list at the time point when the present number of playing times x has reached the number of writing times y of the selection music program data and to set x and y into 1.

Figure 13:
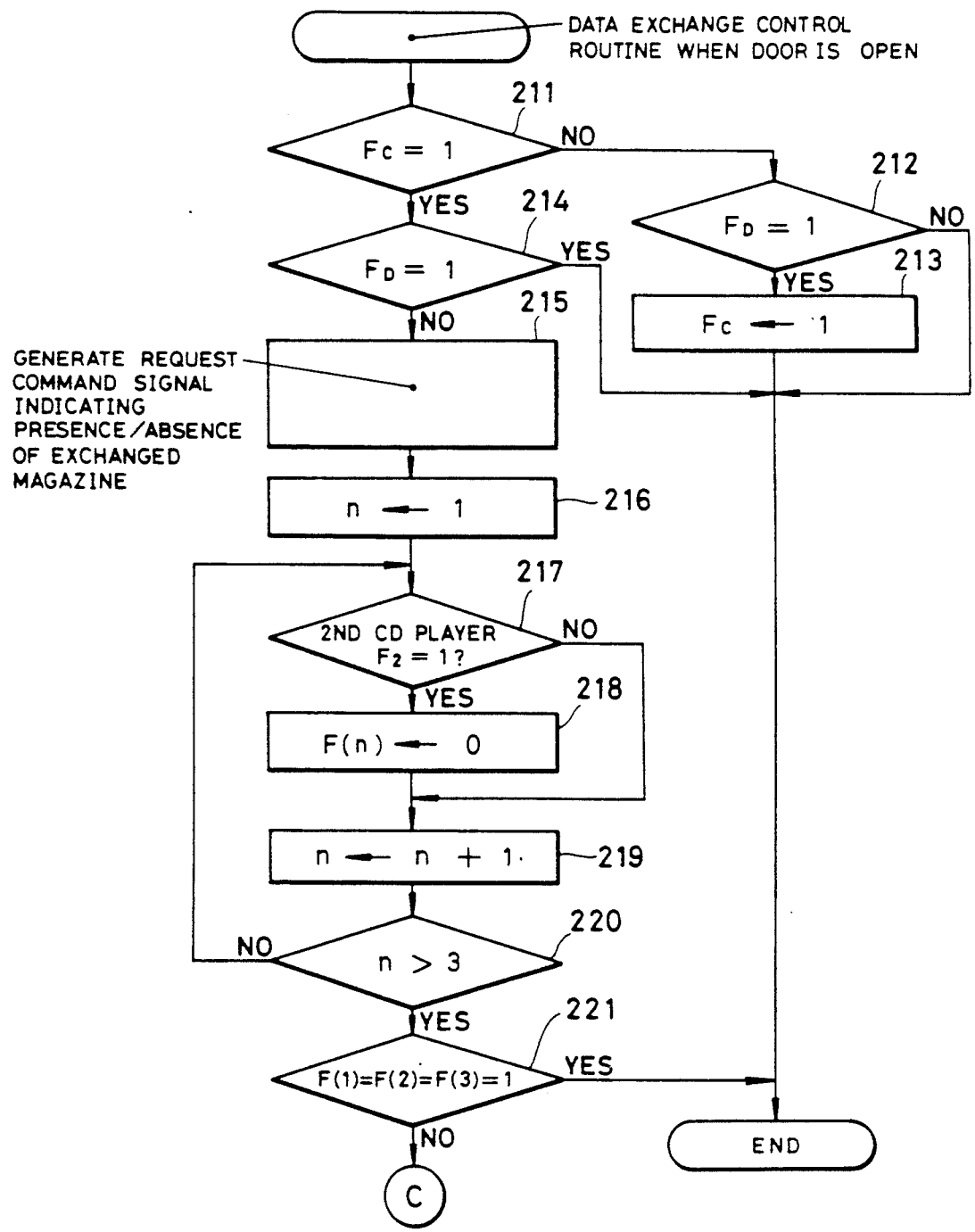

The data exchange control routine when the door is open will now be described. In this routine, as shown in FIG. 13, a check is made to see if a door open/close discrimination flag $F_C$ is equal to 1 or not (step 211). If $F_C=0$, a check is made to see if the door open flag $F_D$ is equal to 1 or not (step 212). If $F_D=0$, the processes of this routine are finished. Since the door 89 is open when $F_D=1$, the flag $F_C$ is set to 1 (step 213) and the processes of this routine are finished. If $F_C=1$, a check is made to see if the door open flag $F_D$ is equal to 1 or not (step 214). If $F_D=1$, since the door 89 is held in the open state, the processes of the routine are finished. If $F_D=0$, since the door 89 is closed, a request command signal indicating whether any exchanged magazine exists or not is generated to the CD players 1 to 3 (step 215). In the CD players 1 to 3, when the door 89 is open, if any one of the magazines was removed or newly inserted, the TOC data is newly read and the internal controller in corresponding one of the CD players 1 to 3 sets the flag $F_2$ to 1. Therefore, the controller 11 sets the variable n to 1 (step 216) and selects the nth CD player and discriminates whether the flag $F_2$ of the nth CD player is equal to 1 or not (step 217). If $F_2=1$, a data read end flag F(n) is reset to 0 (step 218). "1" is added to the variable n (step 219). That is, if $F_2=1$, this means that the magazine of the nth CD player was exchanged. Therefore, the data read end flag F(n) is reset to 0 to read the TOC data of each disc in the nth CD player. If $F_2=0$, this means that no magazine was exchanged, so that step 219 follows. After completion of the process of step 219, a check is made to see if the variable n is larger than 3 or not (step 220). If $n \leq 3$, step 217 follows. If $n > 3$, a check is made to see if all of the data read end flags F(1), F(2), and F(3) equal to 1 or not (step 221). If $F(1)=F(2)=F(3)=1$, this routine is finished. However, if any one of the flags F(1), F(2), and F(3) is set to 0, the processing routine forcedly advances to step 121 of the disc data reading routine. Therefore, the disc number and TOC data of the disc which was set into the magazine of the nth CD player from which the magazine was removed or into which the magazine was newly inserted are written into the RAM 20.

In the above embodiment, data regarding the discs set in all of the magazines of the nth CD player in which the magazine was exchanged is read and written into the RAM 20. However, it is also possible to read the data with respect to only the disc which was set into the magazine which was newly inserted.

Constructions of the foregoing magazine type CD players 1 to 3 will now be described. In FIG. 16, reference numeral 401 denotes a whole construction of the magazine type CD player.

As shown in FIG. 16, three rectangular opening portions 403a to insert magazines 405 as disc enclosing sections into the magazine attaching sections in a player housing 402 are formed in parallel in the vertical direction in a front panel 403 of the player housing 402. The magazines 405 are inserted and set into the magazine attaching sections. Each of the opening portions 403a is elongated in the right and left directions. The right and left directions mentioned here denote the directions when they are seen from the rear side toward the front side shown by an arrow Y and the direction indicated by an arrow X corresponds to the left direction. On the other hand, an arrow Z indicates an upper direction.

As shown in FIGS. 17(a) to 17(c), each magazine 405 has: a magazine main body 408 as a housing which is flat and rectangular parallelepiped as a whole; and two kinds of total six rectangular plate-like trays 411 (three trays) and 412 (three trays) each of which can hold a disc 410 on a major surface. The trays 411 and 412, accordingly, discs 410 are sequentially arranged and enclosed at a predetermined pitch in the direction perpendicular to the disc supporting surface of a turn table, which will be explained hereinlater, in this case, in the vertical direction (the direction of the arrow Z and the direction opposite thereto). The trays 411 and 412 are arranged so as to be rotatable around a rotary supporting shaft 408a which is provided in the right rear edge portion of the magazine main body 408 so as to be elongated in the arrangement direction (vertical direction) of each tray. Each of the trays 411 and 412 can be freely projected from and enclosed into the magazine main body 408 along each major surface.

Seven partition walls 408b are attached in the magazine main body 408 so as to be arranged in the vertical direction (the direction of the arrow Z and the direction opposite thereto). The trays 411 and 412 are attached among the partition walls.

As shown in FIG. 17(b), a pressing lever 414 is arranged in the left front edge portion of the magazine main body 408 so as to be extended in almost the front and back directions (the direction of the arrow Y and the direction opposite thereto). The lever 414 is slidably attached in one end portion, in this case, the front edge portion to the magazine main body 408 through a pin 414a. The pin 414a is extended in the vertical direction (the direction of the arrow Z and the direction opposite thereto). The other end portion, namely, the rear edge portion of the pressing lever 414 can be smoothly come into engagement with the free edge portion of each of the trays 411 and 412. A spring member 414b is in engagement with the pressing lever 414. The spring member 414b presses the lever 414 counterclockwise in FIG.

17(b), thereby applying a tray pressing force to the pressing lever.

Since the magazine 405 has been disclosed in detail in, for instance, JP-A-61-261853 or the like, its detailed description is omitted here.

As shown in FIGS. 16 and 18 to 20, a rectangular parallelepiped chassis 416 is attached in the player housing 402. The chassis 416 comprises: a rectangular plate-like bottom surface portion 416a; rectangular plate-like pillar portions 416b and 416c on both sides which are joined to the bottom surface portion 416a and are extended upward; and a rectangular plate-like frame portion 416d, i.e., an upper surface portion which is coupled such as to be rove between both of the pillar portions and which faces the bottom surface portion 416a.

Figure 18:
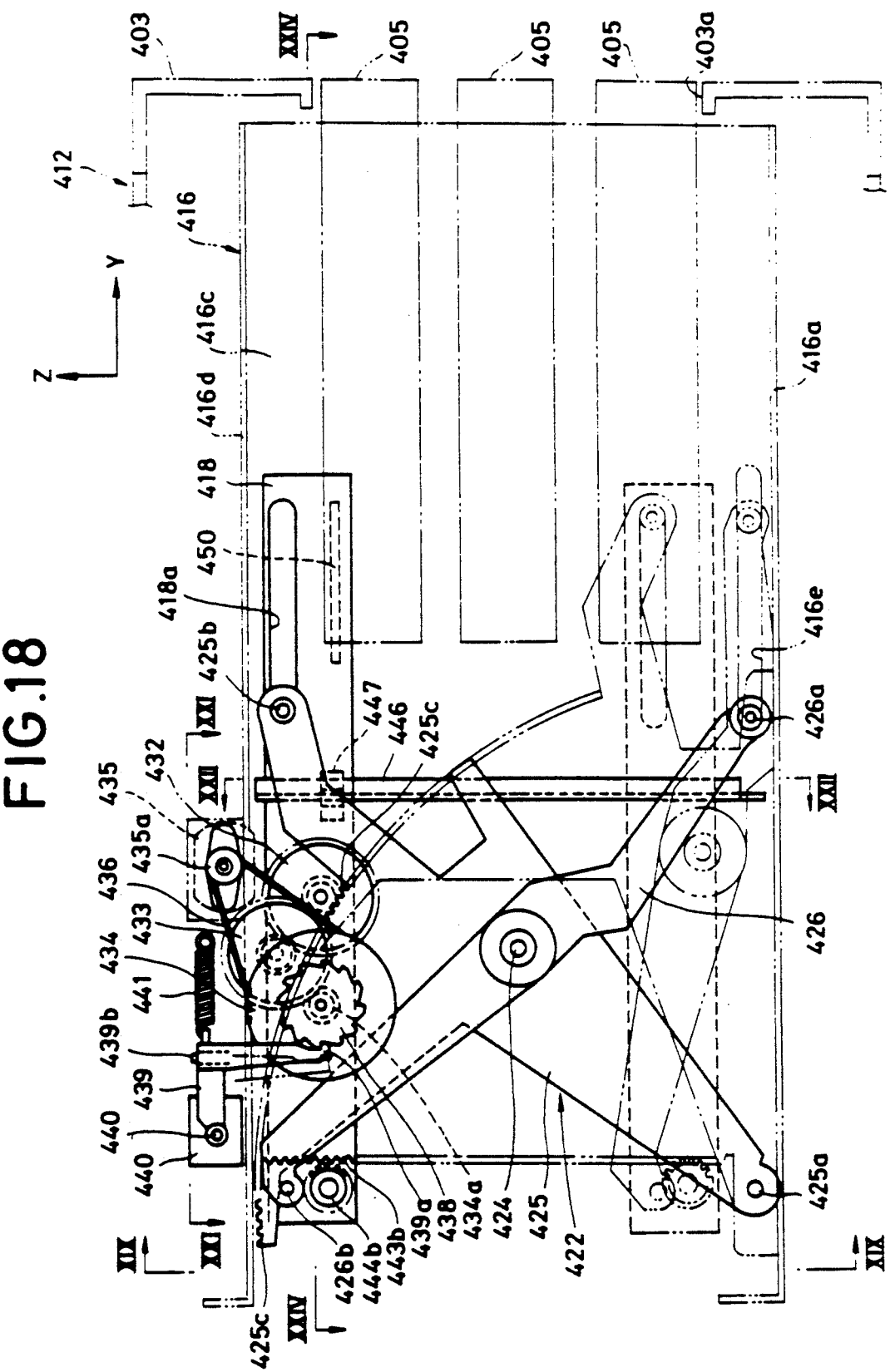
FIGS. 18 to 20 are a right side elevational view, a rear view, and a left side elevational view of an internal mechanism of the magazine type CD player shown in FIG. 16, respectively.
Figure 19:
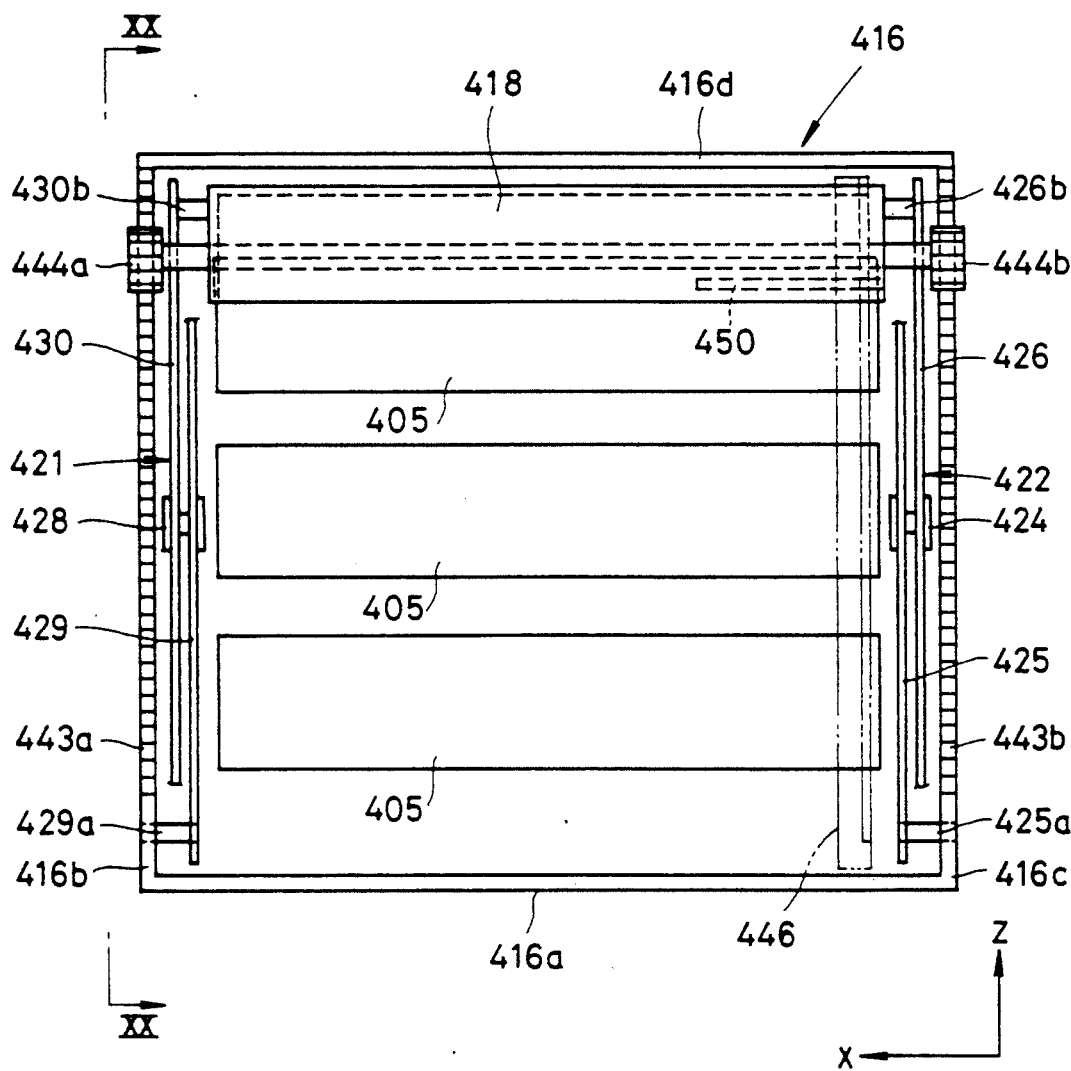
Figure 20:
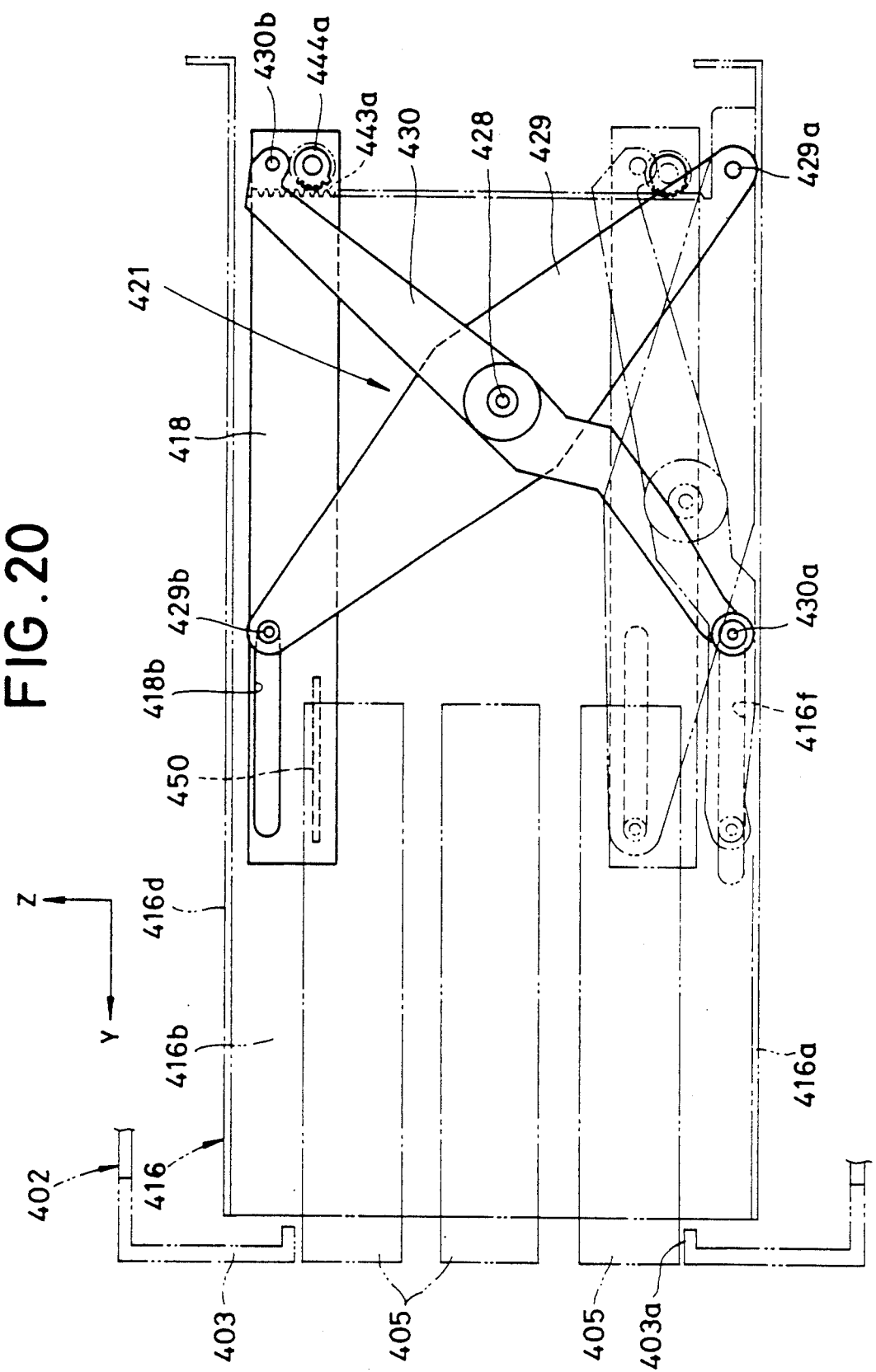

As shown in FIGS. 18 to 20, an almost rectangular supporting member 418 is arranged between both of the pillar portions 416b and 416c of the chassis 416 so as to face the bottom surface portion 416a and frame portion 416d. Playing means, disc moving means, and disc clamping mechanism are mounted onto the supporting member 418. The playing means includes the turn table, pickup, and the like and receives the disc 410 from the magazine 405 and plays it. The disc moving means supplies the disc in the magazine 405 to the playing means and, after completion of the play, for enclosing the disc into the magazine 405. The disc clamping mechanism clamps the disc set onto the turn table. Since the playing means and disc moving means have been disclosed in detail in, for example, JP-A-61-261853 or the like, their detailed descriptions are omitted here except the following portions.

A pair of crossing type links 421 and 422 are provided in the chassis 416 so as to sandwich the supporting member 418 from the left and right sides. The supporting member 418 is movably supported by the links 421 and 422 in the vertical direction, that is, in the arrangement direction of the trays A411 and B412 in each magazine 405.

As shown in FIG. 18, the crossing type link 422 to support the right side portion of the supporting member 418 comprises a fixed pivotally supporting side link 425 and a movable pivotally supporting side link 426 which are mutually pivotally attached by a pin 424. In one end, in this case, lower end portion, the link 425 is pivotally supported through a pin 425a by a lower portion of the pillar portion 416c of the chassis 416. A long hole 418a is formed in the front edge portion of the right side portion of the supporting member 418 so as to be extended in the front/back direction. The other end portion, i.e., the upper end portion of the link 425 is slidably come into engagement with the long hole 418a through a pin 425b. On the other hand, a long hole 416e is formed in the lower portion of the pillar portion 416c of the chassis 416 so as to be extended in the front/back direction. One end portion, i.e., lower edge portion of the link 426 is slidably come into engagement with the long hole 416e through a pin 426a. The other end portion, namely, the upper end portion of the link 426 is pivotally attached to the rear edge portion of the right side portion of the supporting member 418 by a pin 426b.

On the other hand, as shown in FIG. 20, the crossing type link 421 to support the left side portion of the supporting member 418 comprises a fixed pivotally supporting side link 429 and a movable pivotally supporting side link 430 which are mutually pivotally attached by a pin 428. One end portion, that is, upper edge portion of the link 429 is pivotally supported through a pin 429a by a lower portion of the pillar portion 416b of the chassis 416. A long hole 418b is formed in the front edge portion of the left side portion of the supporting member 418 so as to be extended in the front/back direction. The other end portion, i.e., upper end portion of the link 429 is slidably come into engagement with the long hole 418b through a pin 429b. On the other hand, a long hole 416f is formed in a lower portion of the pillar portion 416b of the chassis 416 so as to extended in the front/back direction. One end portion, i.e., lower edge portion of the link 430 is slidably come into engagement with the long hole 416f through a pin 430a. The other end portion, namely, upper end portion of the link 430 is pivotally attached to the front edge portion of the left side portion of the supporting member 418 by a pin 430b.

As shown in FIG. 18, an arc-like sector gear 425c in which the pin 425a as a center of the pivotal motion of the fixed pivotally supporting side link is set to a center of curvature of the arc is integratedly formed on the swing edge portion side than the crossing point of the fixed pivotally supporting side link 425 of the crossing type link 422 to support the right side of the supporting member 418. A small gear portion of a double gear 432 which is constructed by concentrically and integratedly forming two large and small gears is in engagement with the sector gear 425c. A small gear portion of another similar double gear 433 is in engagement with a large gear portion of the double gear 432. A large gear portion of the double gear 433 is in engagement with a gear 434a which is concentrically and integratedly formed with a toothed belt wheel 434 of a large diameter. A motor 435 is arranged over the double gear 432. A toothed belt 436 is rove between a toothed belt wheel 435a of a small diameter which was fitted to an output shaft of the motor 435 and the toothed belt wheel 434 of a large diameter. The double gears 432 and 433, toothed belt wheels 434 and 436, and motor 435 are supported by a subchassis (not shown) attached to the frame portion 416d of the chassis 416.

Link driving means for applying a moment to each of the crossing type links 421 and 422 is constructed by the double gears 432 and 433, toothed belt wheels 434 and 436, toothed belt 436, gear 434a, and motor 435. That is, when the motor 435 rotates in both of the forward and backward directions, the double gear 432 rotates. Thus, the fixed pivotally supporting side link 425 of the crossing type link 422 is swung and both of the crossing type links 421 and 422 are made operative. The supporting member 418 reciprocates in the tray arrangement direction in each magazine 405. As mentioned above, since there is used a construction such that a moment is applied to a swing edge portion of the fixed pivotally supporting side link 425, even if an output of the motor 435 is small, a large moment can be applied to the crossing type links. Consequently, the motor 435 of a small size can be used.

Positioning means for positioning the foregoing playing means in the tray arrangement direction together with the supporting member 418 on which the playing means was mounted is constructed by the crossing type links 421 and 422 and the link driving means.

Figure 21:
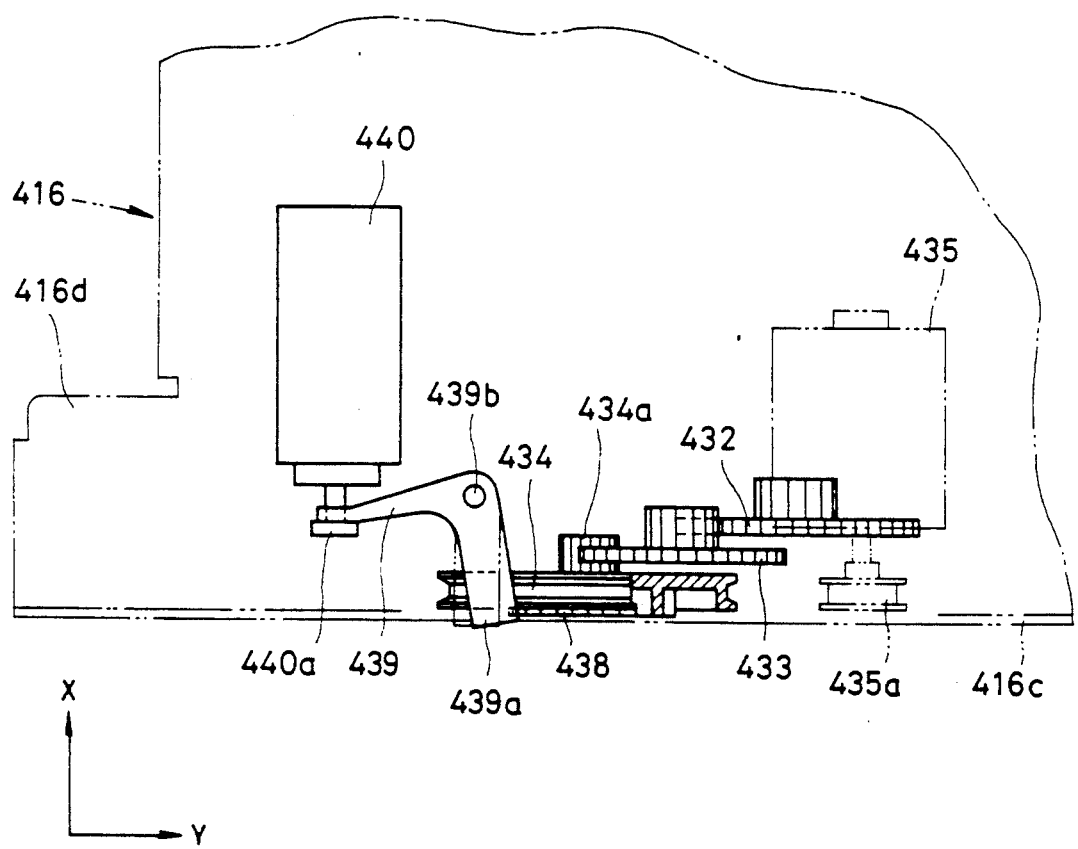
FIG. 21 is a sectional view taken along the line XXI—XXI in FIG. 18.
Figure 22:
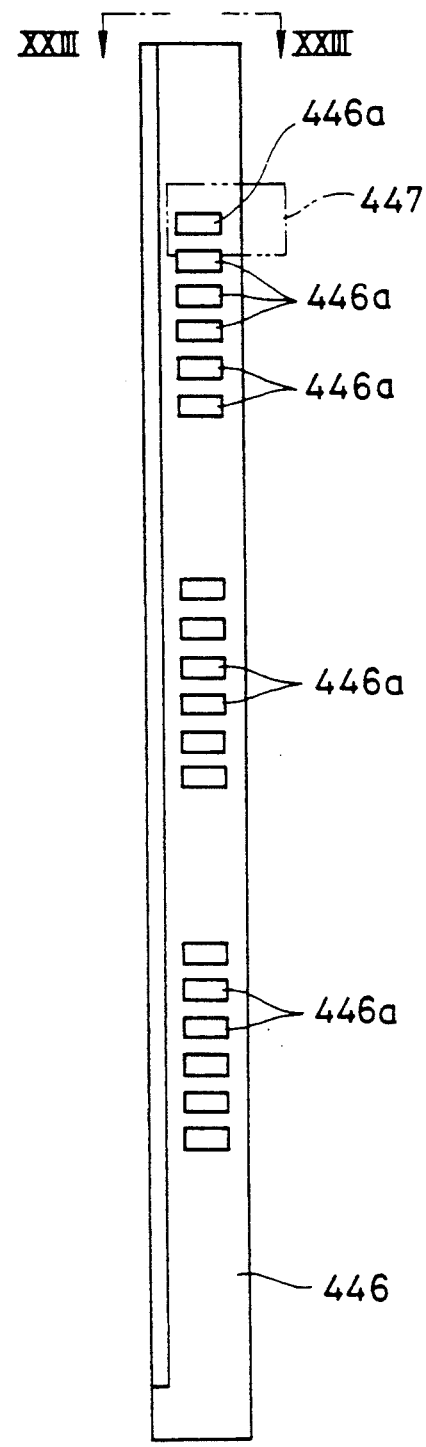
FIG. 22 is a sectional view taken along the line XXII—XXII in FIG. 18.
Figure 23:
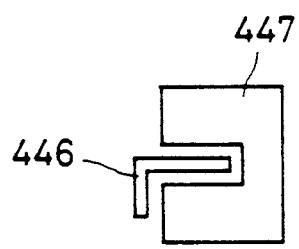
FIG. 23 is a sectional view taken along the line XXIII—XXIII in FIG. 22.

As shown in FIGS. 18 and 21, a ratched wheel 438 is concentrically and integratedly provided for the toothed belt wheel 434 as a component part of a motive power transferring mechanism to transfer a driving force from the motor 435 to the crossing type links. A selecting lever 439 having at one end portion a click 439a which can be come into engagement with the ratched wheel 438 is provided. The lever 439 is attached to the frame portion 416d of the chassis 416 through a pin 439b so as to be pivotally movable in an almost central portion. The other edge portion of the selecting lever 439 is coupled to an output shaft 440a of a solenoid plunger 440. When the solenoid plunger 440 operates and the output shaft 440a is drawn back, the click 439a of the selecting lever 439 disengages from the ratched wheel 438. On the other hand, a coil spring 441 to press the selecting lever 439 so that the click 439a of the selecting lever 439 is come into engagement with the ratched wheel 438 is coupled to a free edge portion of the lever 439.

A ratchet mechanism is constructed by the ratched wheel 438 and the selecting lever 439 having the click 439a. The solenoid plunger 440 and coil spring 441 are provided to selectively make the ratchet mechanism operative. In the above construction, the rotary member, namely, the toothed belt wheel 434 is retained at a position of a predetermined angle by the engagement between the ratched wheel 438 and the click 439a of the ratchet mechanism. The playing means which is moved in the tray arrangement direction by the operations of the crossing type links 421 and 422 mentioned above is positioned to a location corresponding to each tray in the magazine 405 at a high accuracy.

As shown in FIGS. 18 to 20, a pair of rack portions 443a and 443b for synchronization are formed in parallel in the rear edge portions of the left and right pillar portions 416b and 416c of the chassis 416 along the moving direction of the supporting member 418 on which the playing means was mounted. A pair of pinions 444a and 444b which are coaxially provided in the rear edge portion of the supporting member 418 are come into engagement with the rack portions 443a and 443b, respectively. By providing such synchronizing means, the left and right crossing type links 421 and 422 extremely accurately synchronously operate, so that the movement of the playing means in the tray arrangement direction and the positioning for each tray in the magazine 405 are executed at a high accuracy.

As shown in FIGS. 18, 19, 22, and 23, an address plate 446 is arranged behind the magazine attaching portion. The address plate 446 has total 18 slits 446a in which every six slits are arranged along the moving direction of the playing means so as to correspond to the trays in each magazine 405. The address plate 446 is fixed to the chassis 416. On the other hand, in correspondence to the slit 446a of the address plate 446, a photo sensor 447 to detect the slit 446a is attached to the supporting member 418 which supports the playing means. A slit detection signal which is obtained from the photo sensor 447 is sent to a counter (not shown) to count the slit detection signal. A controller (not shown) to control the operation of the CD player is arranged at a predetermined position in the player housing 402. The controller knows the stop position of the supporting member 418 by a count value of the counter.

As shown in FIGS. 17(b), 18 to 20, and 24, a tray extruding member 450 for coming into engagement with each tray in the magazine 405, for extruding the tray from the magazine 405, and for enclosing the tray into the magazine 405 is provided in the right front edge portion of the supporting member 418 on which the playing means was mounted. The tray extruding member 450 is formed in an almost L-shape as a whole. Pins 450a and 450b which are projected and formed onto the tray extruding member 450 are slidably fitted into arc-like guide grooves 418c and 418d formed on the supporting member 418, so that the tray extruding member 450 is guided. That is, the tray extruding member 450 rotates (in the direction of an arrow R) in which the center of curvature of the arc-like guide members 418c and 418d is set as a rotational axis. The tray 411 or 412 is pressed by edge portions 450c and 450d, thereby projecting and enclosing the tray from/into the magazine main body 408.

As shown in FIG. 24, a lever member 451 is arranged over the supporting member 418 and near the tray extruding member 450 so as to freely reciprocate in the right and left directions (directions shown by an arrow T). The lever member 451 is in engagement with the tray extruding member 450 in a right edge portion. On the other hand, although not shown, driving force applying means for applying a driving force to the lever member 451 is provided. The lever member 451 applied with the driving force by the driving force applying means reciprocates, so that the tray extruding member 450 is pivotally moved.

Tray extruding member driving means for pivotally moving the tray extruding member 450 to the supporting member 418 is constructed by the lever member 451 and the driving force applying means for applying the driving force to the lever member 451. On the other hand, disc moving means for supplying the disc in the magazine 405 to the playing means after the playing means was positioned and for enclosing the disc into the magazine 405 after completion of the play is constructed by the tray extruding member driving means and the tray extruding member 450. As mentioned above, since the disc moving means has been disclosed in detail in, for instance, JP-A-61-261853 or the like, its detailed description is omitted.

As shown in FIG. 19, the tray extruding member 450 for extruding and inserting the tray from/into the magazine 405 is arranged inside of the crossing type links 421 and 422 to move the playing means in the tray arrangement direction. Therefore, the crossing type links 421 and 422 do not interfere with the magazine 405 and the other mechanisms. The movement of the playing means in the tray arrangement direction and the driving of the tray extruding member 450 can be always smoothly performed.

The operation of the magazine type CD player with the above construction will now be simply described.

First, when a disc to be played is designated by operating the operating section (not shown) on the front panel 403 of the player housing 402, a driving voltage is supplied to the motor 435 and the left and right crossing type links 421 and 422 start the operations. Thus, the supporting member 418, i.e., the playing means moves upward or downward and is positioned to the location corresponding to the disc to be player. Therefore, the tray extruding member 450 mounted on the supporting member 418 is positioned to the engagement location with the tray on which the disc to be played was held. During the movement of the supporting member 418, the solenoid plunger 440 shown in FIGS. 18 and 21 is held in the ON state and the click 439a of the ratchet mechanism is away from the ratched wheel 438. Therefore, no operation sound of the ratchet mechanism is generated during the movement of the supporting member 418. When the positioning of the supporting member 418 is completed, the motor 435 is stopped and the solenoid plunger 440 is simultaneously turned off. Thus, the ratched wheel 438 and click 439a of the ratchet mechanism are mutually come into engagement by a pressing force of the coil spring 441. The playing means mounted on the supporting member 418 is positioned at a high accuracy to the location corresponding to the tray on which the disc to be played was held.

After that, the tray extruding member driving means is made operative and the tray extruding member 450 is pivotally moved from the position shown by solid lines in FIGS. 17(b) and 24 to the position shown by an alternate long and two short dashes line in FIG. 24. Therefore, as shown in FIG. 17(b), the tray (e.g., tray 412) on which the disc to be played was held is rotated by about 90° and is projected to the outside of the magazine main body 408. The disc on the tray is attached to the playing means and clamped onto the turn table.

In this state, the play of the disc can be executed. The turn table is rotated, the pickup is made operative, and the play is started.

After the play was finished, the disc is enclosed into the magazine 405. However, since the disc enclosing operations are executed by the steps which are quite opposite to the disc loading operations mentioned above, their detailed descriptions are omitted here. A series of above operations are repeated hereinafter in accordance with the number of music programs designated.

Although not shown, the pickup can be fixed with a screw at the side plate of the player housing 402. An accident during the conveyance of the player can be prevented.

As mentioned above, in the apparatus for selectively playing a plurality of discs enclosed therein according to the invention, if the magazine type disc player having a disc including a designated music program to be played next to a designated music program which is being played is different from the magazine type disc player which is executing the playing operation, the magazine type disc player having the disc including the designated music program to be played next is set to the playing operation start standby mode with respect to the designated music program to be played next, and after completion of the playing operation of the magazine type disc player which is executing the playing operation, the playing operation start standby mode is released and the playing operation is started. Therefore, when the magazine type disc player having the disc including the designated music program to be played next to the designated music program which is being played is different from the magazine type disc player which is executing the playing operation, immediately after the end of the play of one designated music program, the play of the next playing designated music program can be started. Thus, a larger number of designated music programs can be played in a short time as compared with the conventional apparatus.

What is claimed is:

1. An apparatus for selectively playing a plurality of discs enclosed therein which has a plurality of magazine type disc players, each of which includes at least one magazine, each of said magazines containing a plurality of discs therein, said plurality of disc players receiving and playing designated music programs in accordance with music program selection operations, said plurality of magazine type disc players including first and second magazine type disc players for playing current and next designated music programs, comprising:

discriminating means for determining which of said plurality of disc players includes a next magazine that has a disc including a next designated music program to be played;

first means for instructing a second magazine type disc player to execute a search operation to find the next designated music program when said discriminating means determines that said next magazine in includes in said second magazine type disc player and for setting said second magazine type disc player into a playing operation start standby mode once said second magazine type disc player identifies that said next designated music program has been found; and second means for releasing the playing operation start standby mode of said second magazine type disc player and for starting the playing operation when a playing operation of said first magazine type disc player ends, wherein each of said magazine type disc players has exclusive access to a predetermined number of magazines.

2. An apparatus according to claim 1, wherein said second magazine type disc player is set into a pause state after the search operation is completed.

3. An apparatus according to claim 1, wherein said second magazine type disc player is set into a stop state after the search operation is completed.

4. The apparatus of claim 1, said discriminating means further comprising:

means for identifying a magazine number of said next magazine;

means for identifying the second magazine type disc player based upon said identified magazine number; and means for transmitting a search command and the next designated music program to the identified second magazine type disc player.

5. The apparatus of claim 1, further including means for reading each magazine number, disc number and table of contents data for each disc from each disc player and for writing a table of contents data map into RAM.

6. The apparatus of claim 5, wherein a portion of the table of contents data map corresponding to a removed magazine is updated base upon a new magazine exchanged for the removed magazine.

7. The apparatus of claim 5, wherein said discriminating means includes means for reading said magazine number from said RAM and identifying said second magazine type disc player based upon said magazine number.

8. The apparatus of claim 1, wherein said discriminating means includes means for determining a magazine number of said next magazine and identifying said second magazine type disc player based upon said magazine number.

* * * * *